US010193339B2

(12) United States Patent
Ichino

(10) Patent No.: US 10,193,339 B2
(45) Date of Patent: Jan. 29, 2019

(54) GRID INTEGRATED CONTROL APPARATUS, GRID CONTROL SYSTEM, GRID CONTROL APPARATUS, PROGRAM, AND CONTROL METHOD

(71) Applicant: NEC Corporation, Tokyo (JP)

(72) Inventor: Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 674 days.

(21) Appl. No.: 14/418,278

(22) PCT Filed: Apr. 16, 2013

(86) PCT No.: PCT/JP2013/061322
§ 371 (c)(1),
(2) Date: Jan. 29, 2015

(87) PCT Pub. No.: WO2014/020951
PCT Pub. Date: Feb. 6, 2014

(65) Prior Publication Data
US 2015/0214737 A1    Jul. 30, 2015

(30) Foreign Application Priority Data

Jul. 30, 2012 (JP) ................................. 2012-168250

(51) Int. Cl.
*G05B 15/02* (2006.01)
*H02J 13/00* (2006.01)
(Continued)

(52) U.S. Cl.
CPC ................ *H02J 3/00* (2013.01); *G05B 15/02* (2013.01); *H02J 3/06* (2013.01); *H02J 13/0079* (2013.01); *H02J 2003/146* (2013.01)

(58) Field of Classification Search
CPC .. H02J 3/00; H02J 13/0079; H02J 3/06; H02J 2003/146; G05B 15/02
(Continued)

(56) References Cited

U.S. PATENT DOCUMENTS

2010/0179704 A1* 7/2010 Ozog ............... G06Q 10/06315
700/291
2012/0029720 A1* 2/2012 Cherian .................. H02J 13/00
700/297
(Continued)

FOREIGN PATENT DOCUMENTS

EP    2 477 297 A1    7/2012
EP    2 498 367 A1    9/2012
(Continued)

OTHER PUBLICATIONS

English translation of Kosaka, Japanese Patent Publication No. 2010-213420.*
(Continued)

*Primary Examiner* — Ziaul Karim
(74) *Attorney, Agent, or Firm* — Finnegan, Henderson, Farabow & Garrett & Dunner, L.L.P.

(57) ABSTRACT

At least one grid (3000) distributes power to a consumer (7000). The grid (3000) transmits power to the other grid (3000). A grid integrated control apparatus (2000) includes a supply and demand energy information receiver unit (2030) that receives supply and demand energy information indicating a difference between energy supplied to the other grid (3000) and energy supplied from the other grid (3000) with respect to each grid (3000), a cost information receiver unit (2050) that receives cost information indicating a power transmission cost between the grids (3000), and a grid control unit (2020) that determines a transmitted energy between each grid (3000) so as to reduce the total of power transmission costs while satisfying power demand of each
(Continued)

grid (3000), on the basis of the supply and demand energy information and the cost information.

16 Claims, 17 Drawing Sheets

(51) Int. Cl.
    *H02J 3/00*     (2006.01)
    *H02J 3/06*     (2006.01)
    *H02J 3/14*     (2006.01)

(58) Field of Classification Search
    USPC .................................................. 700/285–297
    See application file for complete search history.

(56) References Cited

U.S. PATENT DOCUMENTS

| | | | | |
|---|---|---|---|---|
| 2012/0233060 | A1* | 9/2012 | Terano | G06Q 30/06 705/37 |
| 2013/0076140 | A1* | 3/2013 | Darden | H02J 3/381 307/64 |
| 2013/0110298 | A1* | 5/2013 | Beveridge | F01K 13/02 700/287 |
| 2013/0166085 | A1* | 6/2013 | Cherian | G05B 13/02 700/291 |
| 2013/0211601 | A1* | 8/2013 | Cheng | G06F 17/5018 700/282 |
| 2014/0018969 | A1* | 1/2014 | Forbes, Jr. | H02J 3/32 700/295 |

FOREIGN PATENT DOCUMENTS

| | | |
|---|---|---|
| EP | 2 533 189 A1 | 12/2012 |
| JP | 2001-309559 | 11/2001 |
| JP | 2007-143364 | 6/2007 |
| JP | 2010-213420 | 9/2010 |
| JP | 2011-61931 | 3/2011 |
| JP | 4783453 | 7/2011 |
| WO | WO 2009/072453 A1 | 6/2009 |

OTHER PUBLICATIONS

International Search Report and Written Opinion dated Jun. 25, 2013 in corresponding PCT International Application.

Extended European Search Report dated Mar. 31, 2016, by the European Patent Office in counterpart European Patent Application No. 13826414.8.

* cited by examiner

FIG. 7

| GRID ID | POWER SUPPLY AND DEMAND AMOUNT AT PERIOD OF TIME 1 | POWER SUPPLY AND DEMAND AMOUNT AT PERIOD OF TIME 2 | ... |
|---|---|---|---|
| 1 | +300kWh | -100kWh | ... |
| 2 | -300kWh | -200kWh | ... |
| 3 | +200kWh | +200kWh | ... |
| ... | ... | ... | ... |

FIG. 8

| GRID ID | POWER STORAGE UNIT ID | STORED POWER AMOUNT |
|---------|----------------------|---------------------|
| 1 | 1 | E(1,1) |
| 1 | 2 | E(1,2) |
| 2 | 1 | E(2,1) |
| ⋮ | ⋮ | ⋮ |

FIG. 10

| POWER STORAGE UNIT ID | CHARGING OR DISCHARGING POWER AMOUNT |
|---|---|
| 1 | +X |
| 2 | −Y |
| 3 | +Z |
| ⋮ | ⋮ |

FIG. 14

| GRID ID | GENERATED POWER AMOUNT DURING PERIOD OF TIME 1 | GENERATED POWER AMOUNT DURING PERIOD OF TIME 2 | ... |
|---|---|---|---|
| 1 | 100kWh | 200kWh | ... |
| 2 | 200kWh | 150kWh | ... |
| 3 | 300kWh | 100kWh | ... |
| ... | ... | ... | ... |

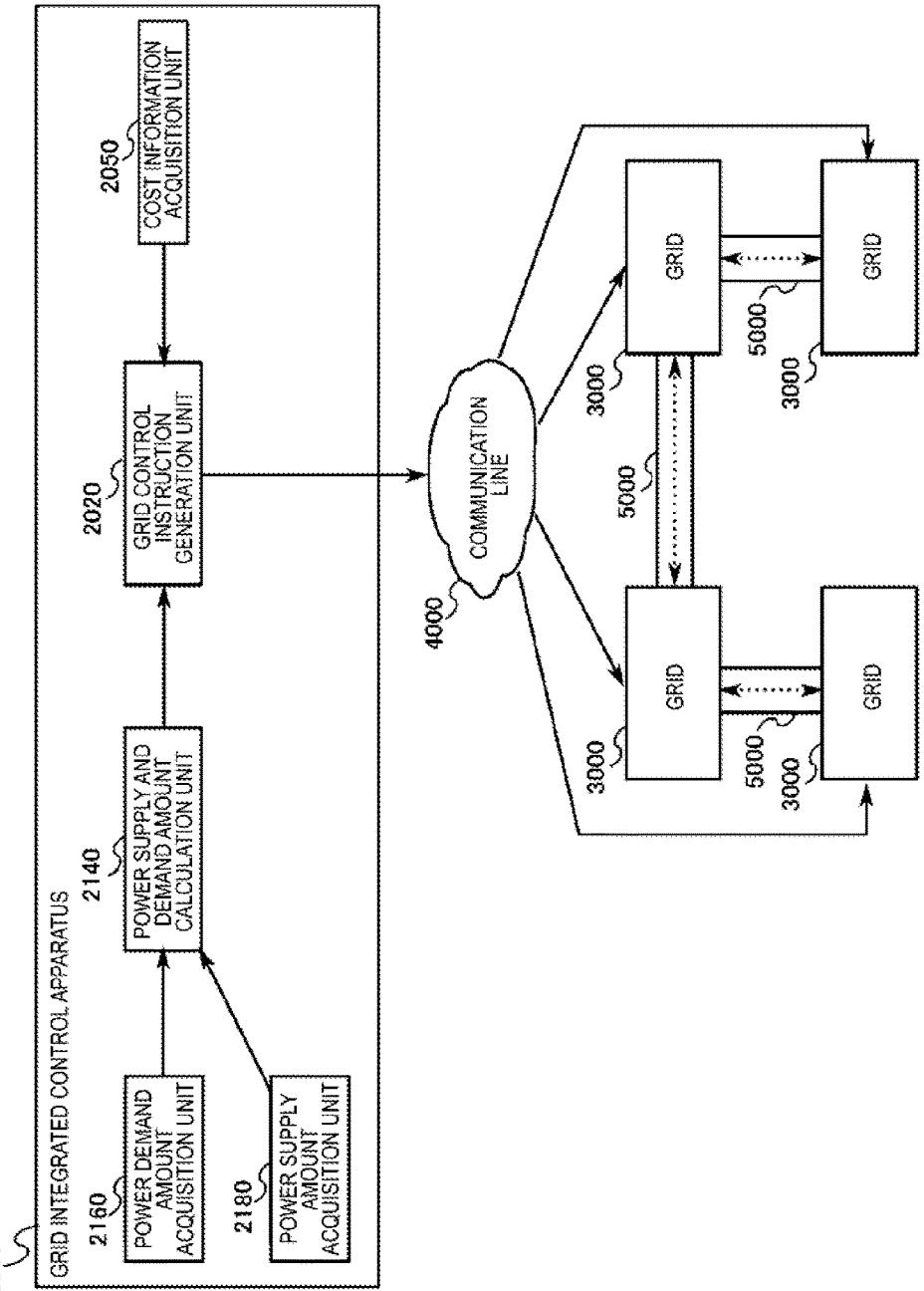

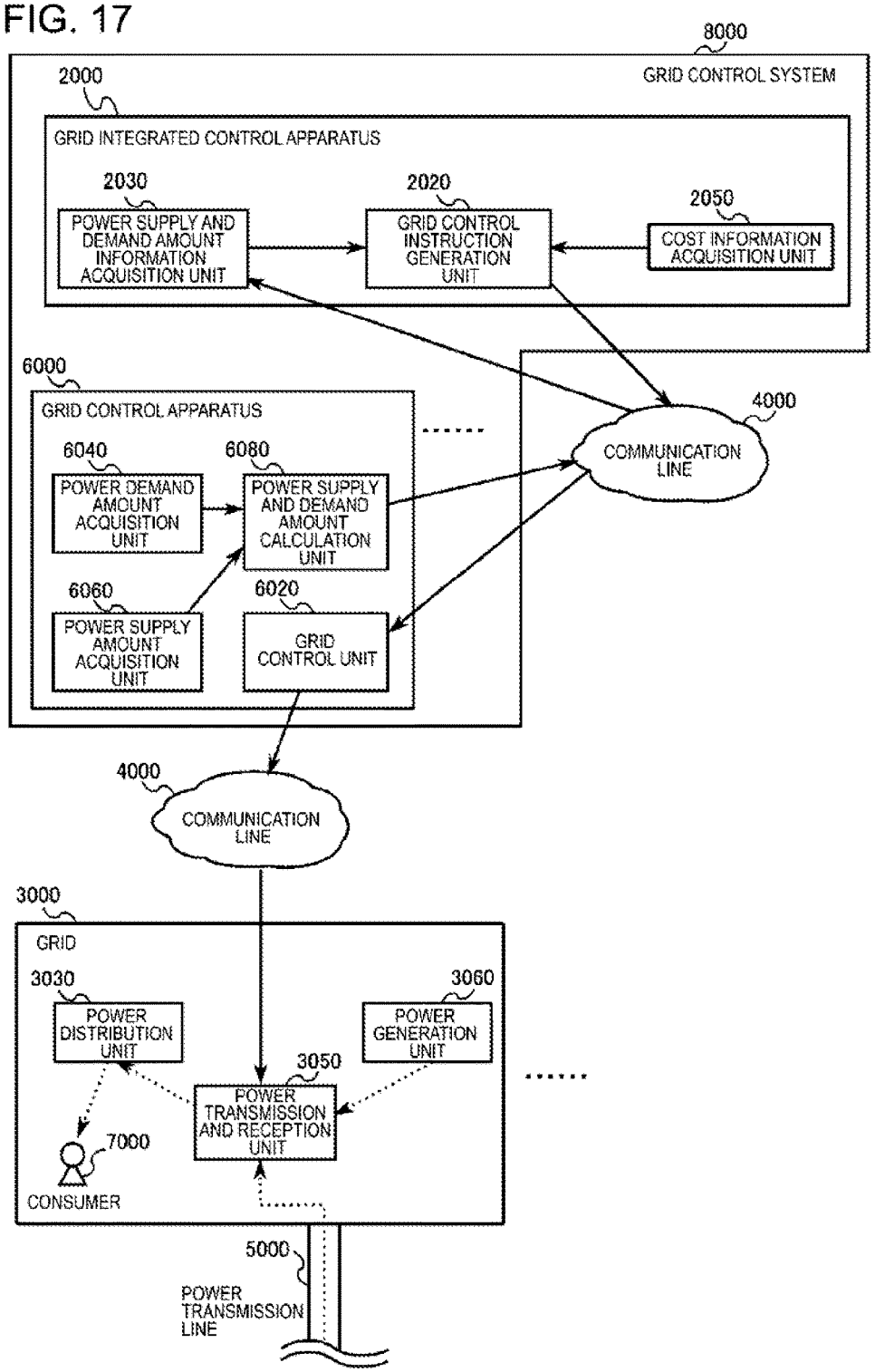

US 10,193,339 B2

GRID INTEGRATED CONTROL APPARATUS, GRID CONTROL SYSTEM, GRID CONTROL APPARATUS, PROGRAM, AND CONTROL METHOD

CROSS-REFERENCE TO RELATED PATENT APPLICATIONS

This application is a National Stage Entry of International Application No. PCT/JP2013/061322, filed Apr. 16, 2013, which claims priority from Japanese Patent Application No. 2012-168250, filed Jul. 30, 2012. The entire contents of the above-referenced applications are expressly incorporated herein by reference.

TECHNICAL FIELD

The present invention relates to a grid integrated control apparatus, a grid control system, a grid control apparatus, a program, and a control method.

BACKGROUND ART

New electric power networks in which an autonomously controlled power system is arranged dispersedly are proposed. One of such power networks is a smart grid. Here, this distributed power system is called a grid. The grid includes power generation facilities using renewable energy such as wind power or sunlight therein, in addition to a power supply from an external backbone power system provided with traditional power generation facilities, and often supplies power from these power generation facilities. In this manner, the balance between the supply and the demand of power can be adjusted more flexibly.

For example, Patent Document 1 discloses a comprehensive monitoring system that alleviates a fluctuation in the supply energy, which occurs because a backbone power system is out of service due to its failure or construction, by adjusting the energy using such renewable energy.

In addition, there is proposed a method of adjusting the balance between the supply and the demand of power more flexibly by interchanging power between each grid.

For example, Patent Document 2 discloses a technique of exchanging information on power between distributed grids through data communication lines, and interchanging power between the grids in an asynchronous manner.

In addition, Patent Document 3 discloses an energy facility management planning apparatus that determines the amount of energy generation and the transmitted energy for energy generation facilities in order to minimize the total of an energy generation cost for generating heat or power and a power transmission cost required for power transmission.

Further, in order to flexibly adjust the balance between the supply and the demand of power, there is also proposed a method of holding a power storage apparatus in each grid, and temporarily storing power. Such a method is disclosed in, for example, Patent Document 2.

RELATED DOCUMENT

Patent Documents

[Patent Document 1] Japanese Unexamined Patent Publication No. 2011-61931
[Patent Document 2] Japanese Patent No. 4783453
[Patent Document 3] Japanese Unexamined Patent Publication No. 2001-309559

DISCLOSURE OF THE INVENTION

Costs required for power transmission between grids are different from each other. For this reason, the inventor of the present invention has considered that the power transmission cost increases and costs are wasted unless the power transmission costs are taking into account when interchanging power.

An object of the present invention is to provide a grid integrated control apparatus, a program and a control method which are capable of avoiding incurring wasted power transmission costs by interchanging power in consideration of power transmission costs.

According to the present invention, there is provided a grid integrated control apparatus that controls a plurality of grids which are arranged dispersedly. Each of the grids includes: a power transmission and reception unit that transmits and receives power between the grid and other grids through a power transmission line; and a grid control unit that controls the power transmission and reception unit on the basis of a control instruction received from the grid integrated control apparatus connected through a communication line. At least one of the grids includes a distribution unit that distributes power to a consumer consuming power. The grid integrated control apparatus comprises: a supply and demand energy information receiver unit that receives, for each of the grids, supply and demand energy information having supply and demand energy indicating a difference between energy supplied from the grid to other grids and energy supplied to the grid from other grids; a cost information receiver unit that receives cost information indicating a cost required for power transmission between the grids; and a grid control instruction generation unit that determines a combination of the grid that supplies power, the grid that receives power, and transmitted energy, on the basis of the supply and demand energy information received by the supply and demand energy information receiver unit and the cost information received by the cost information receiver unit, and generates the control instruction for controlling power transmission of each of the grids on the basis of the determined combination; and transmitting the control instruction to each of the grids.

According to the present invention, there is provided a grid control system comprising a grid control apparatus and a grid integrated control apparatus that controls a plurality of the grid control apparatuses. The grid is connected to at least one or more other grids through a power transmission line, and includes a power transmission and reception unit that transmits and receives power between the grid and other grids through the power transmission line. At least one of the grids includes a distribution unit that distributes power to a consumer consuming power. The grid control apparatus includes: a demand energy receiver unit that receives demand energy indicating the energy supplied to the grid from other grids; a supply energy receiver unit that receives supply energy indicating the energy supplied from the grid to other grids; a supply and demand energy information generation unit generates supply and demand energy information having supply and demand energy indicating a difference between the supply energy received by the supply energy receiver unit and the demand energy received by the demand energy receiver unit, and transmits the generated information to the grid integrated control apparatus; and a grid control unit that controls the power transmission and reception unit in accordance with an instruction from the grid integrated control apparatus connected through a communication line. The grid integrated control apparatus includes: a supply and demand energy information receiver unit that receives the supply and demand energy information from each of the grid control apparatuses; a cost information receiver unit that receives cost information indicating a cost required for power transmission between the grids; and a grid control instruction generation unit that determines a combination of the grid that supplies power, the grid that receives power, and transmitted energy, on the basis of the supply and demand energy information received by the supply and demand energy information receiver unit and the cost information received by the cost information receiver unit, and transmits an instruction to each of the grid control apparatuses on the basis of the determined combination.

According to the present invention, there is provided a grid control system comprising a grid control apparatus and a grid integrated control apparatus that controls a plurality of the grid control apparatuses. The grid is connected to the grid integrated control apparatus through a communication line, is connected to at least one or more other grids through a power transmission line, and includes a power transmission and reception unit transmitting and receiving power between the grid and the other grid through the power transmission line. At least one of the grids includes a distribution unit that distributes power to a consumer consuming power. The grid control apparatus includes a grid control unit that controls the power transmission and reception unit in accordance with an instruction from the grid integrated control apparatus being connected through a communication line. The grid integrated control apparatus includes: a demand energy receiver unit that receives demand energy indicating the energy supplied to the grid from other grids; a supply energy receiver unit that receives supply energy indicating the energy supplied from the grid to other grids; a supply and demand energy calculation unit that calculates supply and demand energy indicating a difference between the supply energy received by the supply energy receiver unit and the demand energy received by the demand energy receiver unit; a cost information receiver unit that receives cost information indicating a cost required for power transmission between the grids; and a grid control instruction generation unit that determines a combination of the grid that supplies power, the grid that receives power, and transmitted energy, on the basis of the supply and demand energy received from the supply and demand energy calculation unit and the cost information received from the cost information receiver unit, and transmits the instruction to each of the grid control apparatuses on the basis of the determined combination.

According to the present invention, there is provided a grid control apparatus that controls a grid. The grid is connected to at least one or more other grids through a power transmission line, and includes a power transmission and reception unit that transmits and receives power between the grid and other grids through the power transmission line. At least one of the grids includes a distribution unit that distributes power to a consumer consuming power. The grid control apparatus comprises: a demand energy receiver unit that receives demand energy indicating the energy supplied to the grid from other grids; a supply energy receiver unit that receives supply energy indicating the energy supplied from the grid to other grids; a supply and demand energy calculation unit that calculates supply and demand energy indicating a difference between the supply energy received by the supply energy receiver unit and the demand energy received by the demand energy receiver unit; and a grid control unit which controls the power transmission and reception unit in accordance with an instruction from the grid integrated control apparatus, which is connected to the grid control apparatus through a communication line and determines a combination of the grid that supplies power, the grid that receives power, and transmitted energy, on the basis of the supply and demand energy received from the grid control apparatus.

According to the present invention, there is provided a program causing a computer to have a function of operating the grid integrated control apparatus according to the present invention. The program causes the computer to have a function included in each functional configuration unit of the grid integrated control apparatus according to the present invention.

According to the present invention, there is provided a control method which is executed by a computer that controls a plurality of grids which are arranged dispersedly. Each of the grids is connected to at least one or more other grids through a power transmission line, transmits and receives power between the grid and the other grid through the power transmission line, and controls the transmission and reception of the power on the basis of a control instruction received from the computer connected through a communication line. The control method comprises: for each of the grids, receiving supply and demand energy information having supply and demand energy indicating a difference between energy supplied from the grid to other grids and energy supplied to the grid from other grids; receiving cost information indicating a cost required for power transmission between the grids; determining a combination of the grid being a power transmission source, the grid being a power transmission destination, and transmitted energy, on the basis of the supply and demand energy information and the cost information; generating a control instruction for controlling the power transmission of each of the grids on the basis of the determined combination; and transmitting the control instruction to each of the grids.

According to the present invention, it is possible to provide a grid integrated control apparatus, a program and a control method which are capable of avoiding incurring wasted power transmission costs by interchanging power in consideration of power transmission costs.

BRIEF DESCRIPTION OF THE DRAWINGS

The above-mentioned objects, other objects, features and advantages will be made clearer from the preferred exemplary embodiments described below, and the following accompanying drawings.

FIG. 7 is a diagram illustrating a configuration of a time-series supply and demand energy table.

FIG. 8 is a diagram illustrating a configuration of a stored energy table.

FIG. 10 is a diagram illustrating a configuration of a charging or discharging control table.

FIG. 14 is a diagram illustrating a configuration of a generated energy history table.

FIG. 16 is a block diagram illustrating a grid integrated control apparatus according to Exemplary embodiment 4 along with the usage environment thereof.

FIG. 17 is a block diagram illustrating a power control system according to Exemplary embodiment 5 along with the usage environment thereof.

DESCRIPTION OF EXEMPLARY EMBODIMENTS

Figure 1:
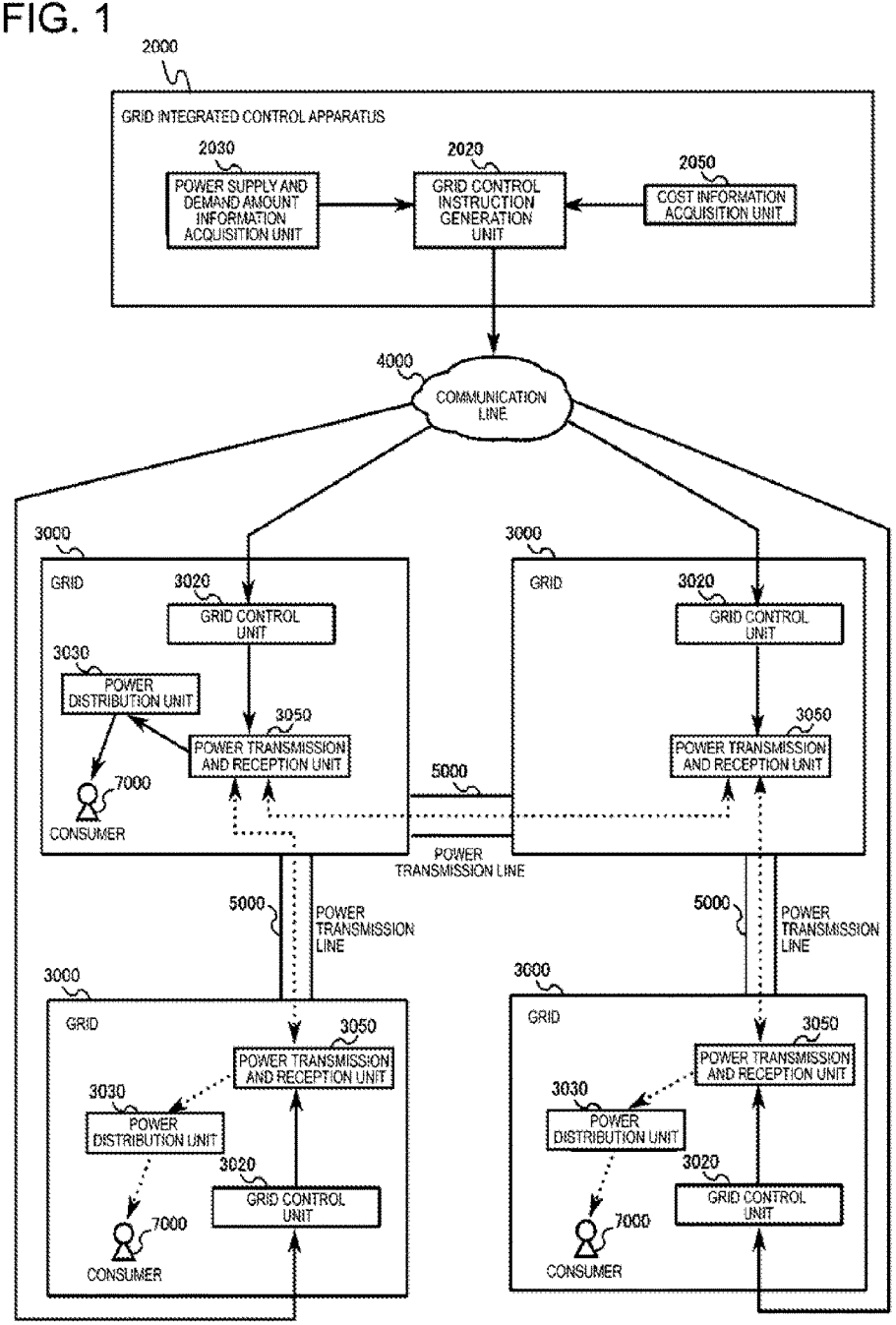
FIG. 1 is a block diagram illustrating a grid integrated control apparatus according to Exemplary embodiment 1 along with the usage environment thereof.

Hereinafter, exemplary embodiments of the present invention will be described with reference to the accompanying drawings. In all the drawings, like elements are referenced by like reference numerals and the descriptions thereof will not be repeated.

Meanwhile, in the following description, each component of each apparatus represents a function-based block rather than a hardware-based configuration. Each component of each apparatus is implemented by any combination of hardware and software based on a CPU, a memory, a program loaded into the memory for embodying the components of the drawing, storage media such as a hard disk which stores the program, and an interface for network connection, in any computers. Embodying methods and apparatuses thereof may be modified in various ways.

[Exemplary Embodiment 1]
<Outline>

FIG. 1 is a diagram illustrating a grid integrated control apparatus 2000 according to Exemplary embodiment 1 along with the usage environment thereof. The grid integrated control apparatus 2000 controls the transmission of power between grids 3000 so as to satisfy power demand of each grid 3000. Here, in FIG. 1, the arrow of a solid line indicates a flow of data, and the arrow of a dotted line indicates a flow of power.

The grid integrated control apparatus 2000 controls at least two or more grids 3000. At least one grid 3000 includes a power distribution unit 3030 that distributes power to a consumer 7000 who consumes power. The grid 3000 includes a grid control unit 3020 and a power transmission and reception unit 3050. The power transmission and reception unit 3050 performs the transmission of power to the other grid 3000 and the reception of power from the other grid 3000. Here, the grid 3000 is connected to at least one or more other grids 3000 through a power transmission line 5000, and enables to mutually transmit power. The grid control unit 3020 controls the transmission and reception of power performed by the power transmission and reception unit 3050, in accordance with an instruction from the grid integrated control apparatus 2000. The power transmission and reception unit 3050 transmits power to the power distribution unit 3030 or the other grid 3000. Meanwhile, when surplus power in each grid 3000 can be consumed within the grid 3000, the supply and demand of the power may be adjusted within the grid 3000 by performing power transmission within the grid 3000. For example, when the consumer 7000 within a certain grid 3000 consumes only a portion of the power planned to be consumed, surplus power is transmitted to the other consumer 7000 within the grid 3000. A method of controlling power transmission between grids described below can also be applied to such power transmission performed within the grid 3000. In this manner, it is possible to reduce power transmission costs within the grid 3000.

The grid integrated control apparatus 2000 includes a supply and demand energy information receiver unit 2030. The supply and demand energy information receiver unit 2030 receives energy information including supply and demand energy. The supply and demand energy is the energy indicating a difference between the energy supplied from the grid 3000 to other grids 3000 (hereinafter, referred to as the supply energy) and the energy supplied to the grid 3000 from other grids 3000 (hereinafter, referred to as the demand energy). Here, when the grid 3000 includes a power generator that generates power, the difference between the supply energy and the demand energy may also be described as the energy obtained by subtracting the total of the energy consumed by each consumer within the grid from the total of the energy generated by power generation within the grid, as a result of the adjustment of the supply and demand of power within the grids. Therefore, in the control of power transmission between the grids described below, priority is taken to power supply and demand within the grids, and then power transmission between the grids can also be performed. In addition, the grid integrated control apparatus 2000 includes a cost information receiver unit 2050. The cost information receiver unit 2050 receives cost information indicating costs required for power transmission in each power transmission line 5000 connecting the grids 3000.

The grid integrated control apparatus 2000 includes a grid control instruction generation unit 2020. The grid control instruction generation unit 2020 determines transmitted energy between the grids 3000, using the supply and demand energy information which is received from the supply and demand energy information receiver unit 2030 and cost information which is received from the cost information receiver unit 2050. That is, individual transmitted energy between each grid is optimized on the basis of the difference between the total of the supply energy of each grid and the total of the demand energy thereof and the cost information. Specifically, the grid integrated control apparatus 2000 determines the transmitted energy between each grid 3000 so as to reduce the total of costs required for power transmission under the condition of satisfying power demand of each grid 3000. A grid control instruction is transmitted to the grid control unit 3020 in order to cause the grid 3000 to perform the determined power transmission.

As described above, the power transmission of the grid 3000 is controlled so as to reduce the total of costs required for power transmission, under the condition of satisfying power demand of the grid 3000, on the basis of the supply and demand energy information of each grid 3000 and the cost information of each power transmission line 5000. Thereby, it is possible to reduce costs required for power transmission between the grids 3000. In addition, a method of controlling power transmission between the grids described below can also be used in reducing costs required for power transmission within the grids 3000. In this case, power transmission is controlled so that power transmission costs are reduced on the basis of the difference between the supply and demand energy within the grids 3000 and the cost information involved in power transmission within the grids 3000.

Hereinafter, the details of the present exemplary embodiment will be described.

<Details of Configuration>

The grid 3000 may include a plurality of power distribution units 3030.

The grid 3000 may include a power generator that generates electric power. The power generator is, for example, a power generator that generates electric power using renewable energy. A specific example is a photovoltaic power generator, a wind power generator, or the like. Besides, for example, the grid 3000 may receive power from traditional power generation facilities such as a nuclear power plant. Apart of or all of power that the grid 3000 receives from the power generator or the traditional power generation facilities become a part of or all of power supplied to the consumer 7000 within the grid 3000 or the other grid 3000.

The grid 3000 is connected to at least one or more other grids 3000 through the power transmission line 5000.

A communication line 4000 may be implemented in a wired manner, in a wireless manner, or in a manner of a combination thereof.

There are various triggers with which the grid integrated control apparatus 2000 performs a process of determining the transmitted energy between the grids 3000. For example, there are a method in which an administrator manually instructs the grid integrated control apparatus 2000 to start the above process, a method in which the grid integrated control apparatus 2000 automatically performs the above process repeatedly, and the like.

<Details of Supply and Demand Energy Information>

Figure 2:
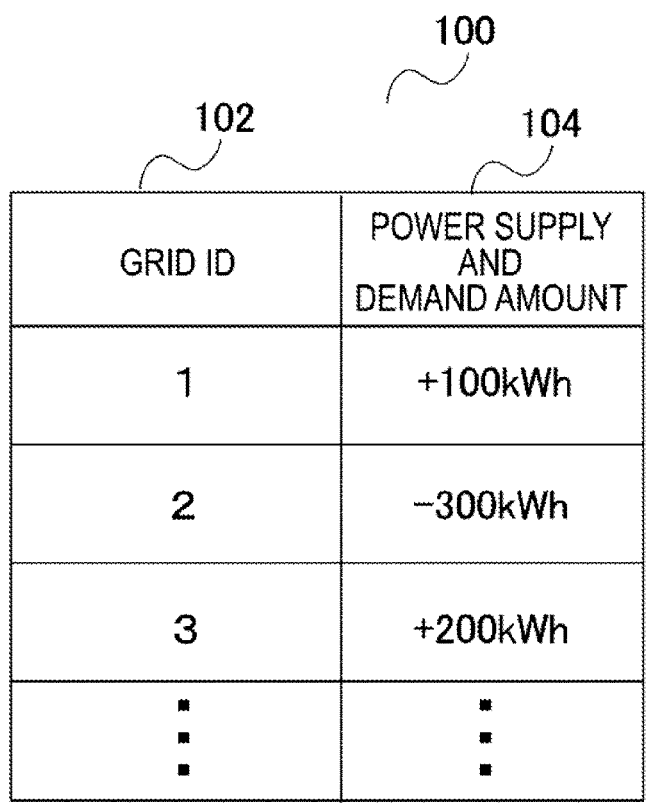
FIG. 2 is a diagram illustrating a configuration of a supply and demand energy table.

The supply and demand energy information is implemented with a supply and demand energy table 100 shown in FIG. 2, for example. The supply and demand energy table 100 includes a grid ID 102 and a supply and demand energy 104 indicating the supply and demand energy of the grid 3000 having an ID indicated by the grid ID 102, for example. Hereinafter, the grid 3000 having the grid ID of i is represented as a grid 3000-i. The supply and demand energy indicates a difference between the supply energy and the demand energy of the grid 3000. Thus, for example, a case where the value of the supply and demand energy 104 is positive indicates that the supply energy is greater than the demand energy, and a case where the value of the supply and demand energy 104 is negative indicates that the demand energy is greater than supply energy. For example, in a case of FIG. 2, the supply energy is greater than the demand energy by 100 kWh in the grid 3000-1, by 200 kWh in the grid 3000-3, respectively. On the other hand, the demand energy of the grid 3000-2 is greater than the supply energy by 300 kWh.

The supply and demand energy is determined by a sales contract of power between owners of the grid 3000, for example. Besides, when the grid 3000 has a power generator, the supply and demand energy is determined by a sales contract of power between the owner of a power generator and the consumer 7000, for example. Besides, when the grid 3000 has a power generator, there is a method in which the supply and demand energy is determined by a difference between the energy generated by a power generation unit 3060 included in the grid 3000 and the energy consumed by the consumer 7000 which is supplied power from the grid 3000, for example.

<Details of Cost Information>

Figure 3:
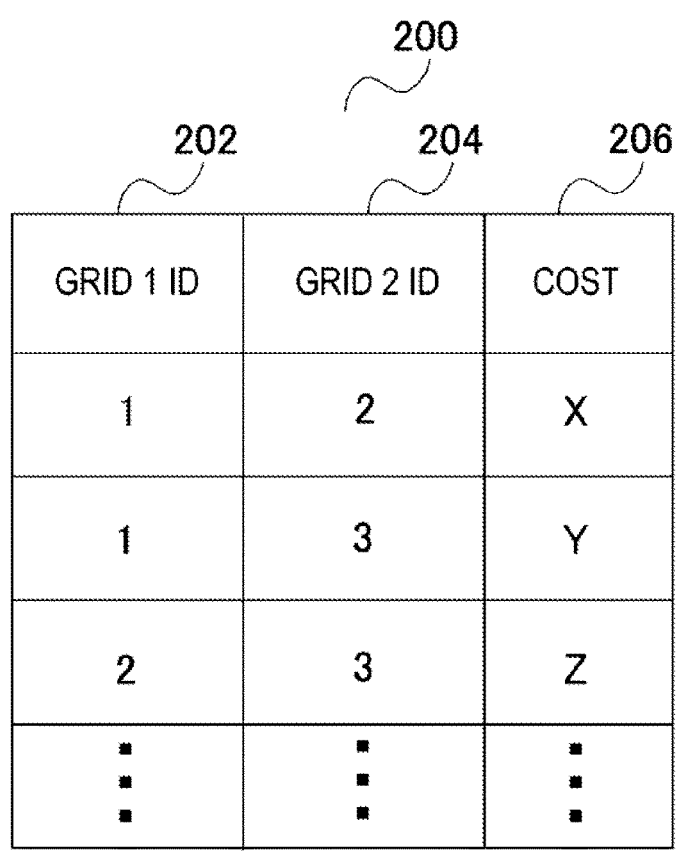
FIG. 3 is a diagram illustrating a configuration of a cost table.

The cost information is implemented with a cost table 200 shown in FIG. 3, for example. For example, The cost table 200 includes a grid 1 ID 202 which is an ID of the grid 3000 on a side of the power transmission line 5000, a grid 2 ID 204 which is an ID of the grid 3000 on the other side of the power transmission line 5000, and a cost 206 indicating costs required for power transmission using the power transmission line 5000 that connects a grid shown by the grid 1 ID 202 and a grid shown by the grid 2 ID 204. The cost 206 indicates a cost of transmitting power of 1 W for an hour through the power transmission line 5000, for example.

There are various methods of determining a power transmission cost. For example, there are a method of determining a cost using a wheeling charge required for using the power transmission line 5000, a method of determining a cost using a power loss caused by power transmission through the power transmission line 5000, a method of determining a cost using both the wheeling charge and the power loss, and the like. For example, the method of determining a cost using both the wheeling charge and the power loss is to normalize the wheeling charge and the power loss, and to set a product of the normalized wheeling charge and the normalized power loss to a cost.

<Details of Grid Control Instruction>

The grid control instruction, which is transmitted from the grid control instruction generation unit 2020 to the grid control unit 3020, has a combination of a grid 3000 of a power transmission destination to which power is transmitted by a grid 3000 and the energy transmitted to the grid 3000. This is implemented with a power transmission control table 300 shown in FIG. 4, for example. The power transmission control table 300 includes a grid ID 302 indicating an ID of the grid 3000 which is a power transmission destination and a transmitted energy 304 indicating transmitted energy transmitted to the grid 3000 shown by the grid ID 302, for example.

<Method of Determining Transmitted Energy between Grids>

For example, a method of determining transmitted energy between the grids is to obtain power transmission Pl(i, j) satisfying a linear programming problem 1 which is represented by the following Expression 1. Here, Pl(i, j) is the magnitude of power transmitted from the grid 3000-i to the grid 3000-j. When the length of time for which the grid 3000 transmits power in accordance with the control of the grid integrated control apparatus 2000 is set to Tp, the transmitted energy transmitted from the grid 3000-i to the grid 3000-j is represented by Pl(i, j)·Tp. The transmitted energy, in a case where a cost required for transmitting power through the power transmission line 5000 is minimized, is determined by solving the following linear programming problem 1.

[Expression 1]

$$\text{Minimize} \sum_{1 \leq i \leq N} \sum_{1 \leq j \leq N} W(i, j) \cdot Pl(i, j) \cdot Tp \quad (1)$$

$$\text{subject to: } \sum_{1 \leq j \leq N} Pl(i, j) \cdot Tp - \sum_{1 \leq j \leq N} Pl(j, i) \cdot Tp = Pe(i), \quad (2)$$

$$\text{for } i = 1, 2, \cdots, N$$

$$Pl(i, j) \leq C(i, j), \quad (3)$$

$$\text{for } i = 1, 2, \cdots, N, j = 1, 2, \cdots, N$$

Expression (1) indicates an objective function of minimizing the total of costs required for power transmission between the grids. Here, W(i, j) indicates a cost at which power having a magnitude of 1 is transmitted per unit time from the grid 3000-*i* to the grid 3000-*j*. In addition, N indicates the total number of grids 3000 under the control of the grid integrated control apparatus 2000.

Expressions (2) and (3) indicate constraints in the above linear programming problem 1. First, Expression (2) is a constraint for satisfying the power demand of the grid 3000-*i*. A difference between the total of transmitted energy (that is, supply energy) transmitted from the grid 3000-*i* to other grid 3000-*j* and the total of received energy (that is, demand energy) received from other grid 3000-*j* corresponds to the supply and demand energy indicated by the supply and demand energy 104 in the supply and demand energy table 100. Here, Pe(i) indicates the supply and demand energy of the grid 3000-*i*.

Expression (3) is a constraint regarding the magnitude of power transmitted from the grid 3000-*i* to the grid 3000-*j*. Expression (3) means that the magnitude of power transmitted from the grid 3000-*i* to the grid 3000-*j* should be equal to or less than the transmission capacity of the power transmission line 5000 that connects the grid 3000-*i* and the grid 3000-*j*. Here, C(i, j) indicates the transmission capacity of the power transmission line that connects the grid 3000-*i* and the grid 3000-*j*.

As a concrete method of solving the linear programming problem 1, there is a method of using a known algorithm such as the simplex method, for example.

<Flow of Grid Control Instruction Generation Process>

Figure 5:
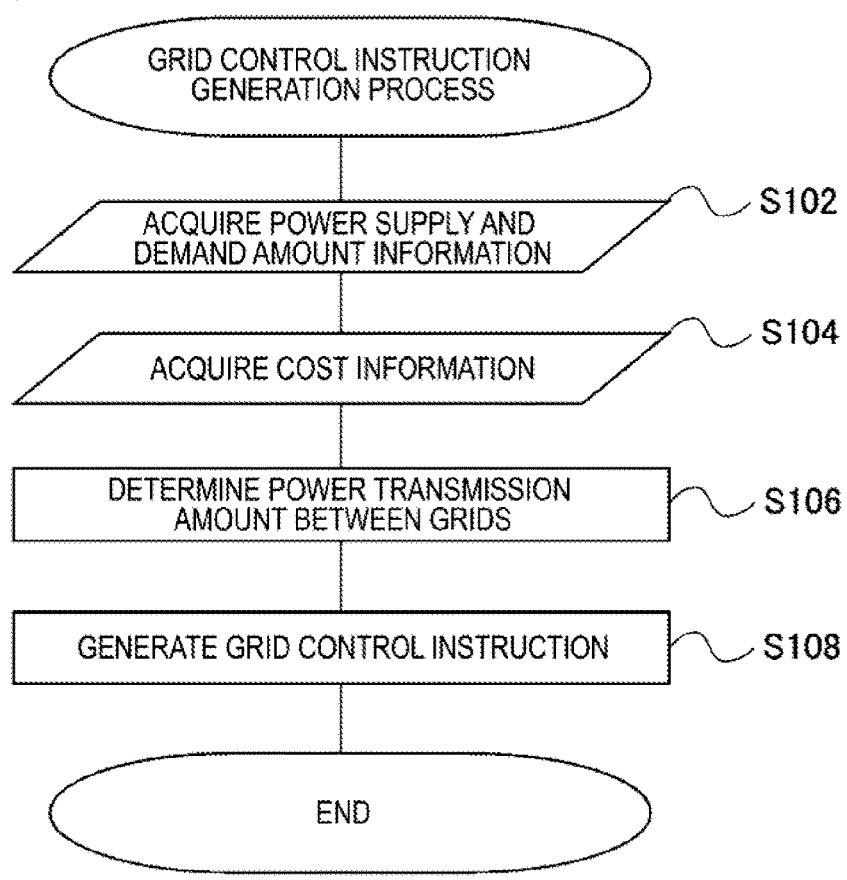
FIG. 5 is a flowchart illustrating a flow of a power transmission control instruction generation process according to Exemplary embodiment 1.

FIG. 5 illustrates a flow of a grid control instruction generation process, which is performed by the grid control instruction generation unit 2020.

First, in step S102, the supply and demand energy information receiver unit 2030 receives the supply and demand energy information. There are various methods of receiving the supply and demand energy information. For example, there are a method in which an administrator inputs the information through an input terminal, a method of receiving the information from the grid 3000, and the like.

Next, in step S104, the cost information receiver unit 2050 receives the cost information. There are various methods of receiving the cost information. There are a method in which an administrator of the grid integrated control apparatus 2000 manually inputs the cost information received from an owner of each power transmission line 5000 in advance, a method of automatically receiving the information from a database or the like of the cost information exposed by an owner of the power transmission line 5000, and the like.

In step S106, the grid control instruction generation unit 2020 determines the transmitted energy between the grids 3000 on the basis of the supply and demand energy information and the cost information. The method is to solve the above mentioned linear programming problem 1, for example.

In step S108, the above mentioned grid control instruction is generated based on the transmitted energy between the grids 3000 which is determined in step S106. As described above, the grid control instruction has the power transmission control table 300, for example. The power transmission control table 300 transmitted to the grid 3000-*i* is generated by making a record of the grid ID 302=j and the transmitted energy 304=Pl(i, j)·Tp, for all Pl(i, j) where i is the ID of a grid of a power transmission source.

There are various triggers for the grid integrated control apparatus 2000 to perform the grid control instruction generation process. For example, the grid integrated control apparatus 2000 receives an instruction from an administrator of the grid integrated control apparatus 2000, and executes the grid control instruction generation process. In addition, the grid integrated control apparatus 2000 may receive a request from the grid 3000, and may execute the grid control instruction generation process. Further, the grid integrated control apparatus 2000 may repeatedly perform the grid control instruction generation process. In this case, the grid integrated control apparatus 2000 performs the grid control instruction generation process at regular time intervals such as one time for an hour, for example. In addition, the grid integrated control apparatus 2000 may perform the grid control instruction generation process at irregular time intervals such as random time intervals, for example.

<Power Transmission Process of Grid Control Unit 3020>

The grid control unit 3020 controls the power transmission and reception unit 3050 in accordance with a grid control instruction received from the grid control instruction generation unit 2020, and transmits power to the other grid 3000 within the time Tp. In case a power transmission control instruction is implemented with the power transmission control table 300, power the amount of which is shown in the transmitted energy 304 is transmitted to the grid 3000 the ID of which is shown in the grid ID 302, for each record of the power transmission control table 300.

<Operational Advantages of Exemplary Embodiment 1>

With the above configuration, according to the present exemplary embodiment, the power transmission of the grid 3000 is controlled so as to reduce the total of costs required for power transmission under the conditions of satisfying the power demand of the grid 3000, on the basis of the supply and demand energy information of each grid 3000 and the cost information of each power transmission line 5000, thereby achieving to reduce costs required for power transmission between the grids 3000.

[Exemplary Embodiment 2]

<Outline>

Figure 6:
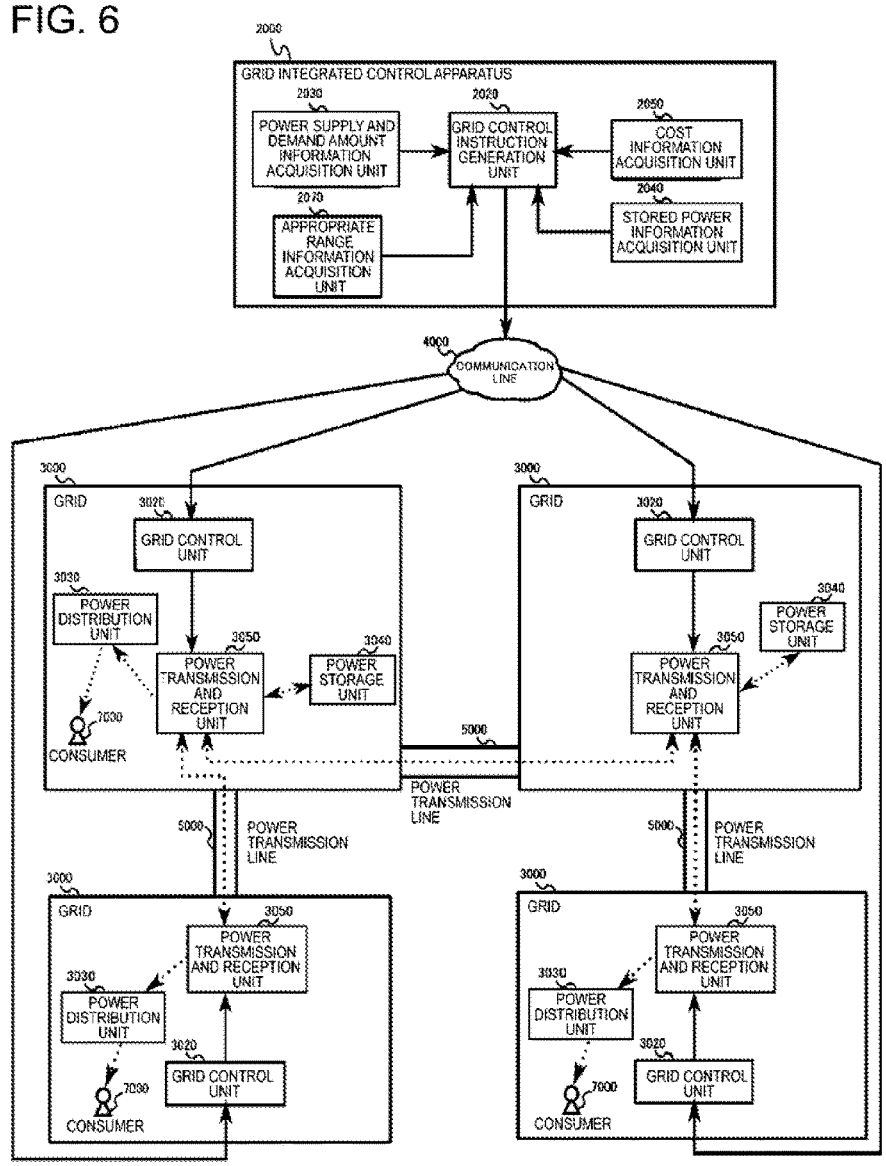
FIG. 6 is a block diagram illustrating a grid integrated control apparatus according to Exemplary embodiment 2 along with the usage environment thereof.

FIG. 6 is a diagram illustrating a grid integrated control apparatus 2000 according to Exemplary embodiment 2 along with the usage environment thereof. Here, in FIG. 6, functional blocks having the same numerals as in FIG. 1 have the same functions as those of the functional blocks FIG. 1 unless particularly described, and thus the description thereof will not be repeated. In addition, the meaning of arrows is the same as in FIG. 1.

In the present exemplary embodiment, at least one or more grids 3000 include one or more power storage units 3040 that store electrical power. The power storage unit 3040 stores power received from the power transmission and reception unit 3050. In addition, the power storage unit 3040 transmits the stored power to the power transmission and reception unit 3050.

The grid control instruction generation unit 2020 includes a stored power information receiver unit 2040 that receives stored power information indicating the currently stored energy in the power storage unit 3040. Further, the grid control instruction generation unit 2020 includes an appropriate range information receiver unit 2070 that receives appropriate range information indicating an appropriate range of the energy stored in the power storage unit 3040. By setting the appropriate range of the stored energy in the power storage unit 3040 and making the stored energy in the power storage unit 3040 be within this appropriate range, it is achieved to handle a case where the energy being able to be supplied from a grid 3000 to the consumer 7000 or other grids 3000 increases or decreases unexpectedly. In addition, the supply and demand energy information receiver unit 2030 in the present exemplary embodiment receives time-series power supply and demand information indicating the supply and demand energy of each grid 3000 in each of at least two or more periods of time.

The grid control instruction generation unit 2020 determines the transmitted energy between the grids 3000 and the energy with which the power storage unit 3040 is charged or discharged at each period of time stated above (hereinafter, referred to as the charging or discharging energy), on the basis of the time-series power supply and demand information, the stored power information, the appropriate range information, and the cost information. Specifically, the combination of: a power transmission source grid; a power transmission destination grid; and transmitted energy, and the charging or discharging energy of the power storage unit 3040 are determined so as to reduce the total of power transmission costs, under two conditions of 1) satisfying the power demand of all the grids the supply and demand energy of which is shown in the time-series supply and demand energy information, and 2) setting the range of the stored energy of all the power storage units 3040 shown in the stored power information to be within an appropriate range, during all the periods of time. The grid control instruction generation unit 2020 transmits to the grid control unit 3020 a grid control instruction for controlling the power transmission of the power transmission and reception unit 3050 and the charging or discharging of the power storage unit 3040.

The grid control unit 3020 controls power transmission of the power transmission and reception unit 3050 in accordance with a power transmission control instruction received from the grid control instruction generation unit 2020. In addition, the grid control unit 3020 controls the charging or discharging of the power storage unit 3040 in accordance with a charging or discharging control instruction received from the grid control instruction generation unit 2020.

With the above configuration, the power transmission of the power transmission and reception unit 3050 and the charging or discharging of the power storage unit 3040 at each period of time are controlled so as to reduce the total of power transmission costs under two conditions of 1) satisfying the power demand of all the grids the supply and demand energy of which is shown in the time-series supply and demand energy information, and 2) setting the range of the stored energy of all the power storage units 3040 shown in the stored power information to be within an appropriate range, during each period of time, on the basis of the time-series power supply and demand information, the stored power information, the appropriate range information, and the cost information. Thereby, it is achieved to reduce power transmission costs while satisfying power demand of the grid 3000, comprehensively over the multiple periods of time. In addition, by using the power storage unit 3040, the power storage unit 3040 is charged during a period of time when there is surplus power, and power shortage can be eliminated by supplying power from the power storage unit 3040 during another period of time when the power shortage would occur even if power is exchanged between the grids 3000. By making the stored energy in the power storage unit 3040 to be within an appropriate range set in advance, it is achieved to handle a case where the energy being able to be supplied from a grid 3000 to the consumer 7000 or other grids 3000 increases or decreases unexpectedly.

Hereinafter, the details of the present exemplary embodiment will be described.

<Details of Time-Series Supply and Demand Energy Information>

The time-series supply and demand energy information indicates the supply and demand energy of each grid 3000 for each of two or more periods of time. The time-series supply and demand energy information is implemented with a time-series supply and demand energy table 400 shown in FIG. 7, for example. The time-series supply and demand energy table 400 includes a grid ID 402 and supply and demand energy for respective periods of time (supply and demand energy 404 during a period of time 1, supply and demand energy 406 during a period of time 2, and the like), for example.

<Details of Stored Power Information>

The stored power information indicates the currently stored energy in the power storage unit 3040. The stored power information is implemented with a stored energy table 500 shown in FIG. 8, for example. The stored energy table 500 includes a grid ID 502 and a power storage unit ID 504 with which the power storage unit 3040 is identified, and a stored energy 506 indicating the currently stored energy in the power storage unit 3040.

<Details of Appropriate Range Information>

The appropriate range information indicates the appropriate range of the stored energy in the power storage unit 3040. The stored energy in the power storage unit 3040 is required to be equal to or less than the rated capacity of the power storage unit 3040. Further, the stored energy in the power storage unit 3040 is preferably determined on the assumption of a case where the energy being able to be supplied from grid 3000 to the consumer 7000 or other grids 3000 increases or decreases unexpectedly. First, in preparation for that there is surplus power since the energy being able to be supplied from the grid 3000 is more than predicted, the upper limit of the stored energy in the power storage unit 3040 is preferably set to be smaller than the rated capacity. Thereby, since the above surplus power can be stored in the power storage unit 3040, it is achieved to reduce the waste of power. In preparation for that the energy being able to be supplied from the grid 3000 is less than predicted, it is preferable to set the lower limit of the stored energy in the power storage unit 3040. In this manner, when power received by the grid 3000 alone leads to power shortage, it is achieved to satisfy power demand by supplying power from the power storage unit 3040.

Figure 9:
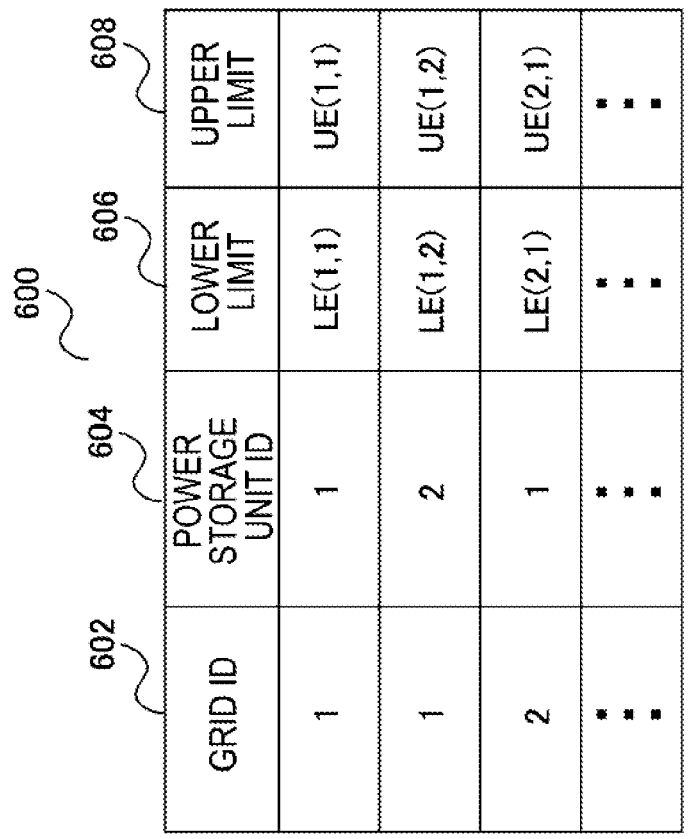
FIG. 9 is a diagram illustrating a configuration of an appropriate range table.

The appropriate range information is implemented with an appropriate range table 600 shown in FIG. 9, for example. The appropriate range table 600 includes a grid ID 602 and a power storage unit ID 604 with which the power storage unit 3040 is identified, a lower limit 606 indicating the lower limit of the stored energy in the power storage unit 3040, and an upper limit 608 indicating the upper limit thereof, for example.

<Grid Control Instruction Indicating Charging or Discharging of Power Storage Unit 3040>

The grid control unit 3020 transmits power from the power transmission and reception unit 3050 to the power storage unit 3040 in order to charge the power storage unit 3040, in accordance with a grid control instruction received from the grid integrated control apparatus 2000, or discharges power from the power storage unit 3040 in order to transmit the power to the power transmission and reception unit 3050. The grid control instruction includes a charging or discharging control table 700 shown in FIG. 10, for example. The charging or discharging control table 700 includes a charging or discharging energy 704 indicating the energy with which the power storage unit 3040 indicated by a power storage unit ID 702 is charged or discharged during a certain period of time, for example. For example, the grid control unit 3020 charges the power storage unit 3040 when the charging or discharging energy 704 is positive, and discharges the power storage unit 3040 when the charging or discharging energy 704 is negative.

<Method of Determining Transmitted Energy between Grids 3000 and Charging or Discharging Energy of Power Storage Unit 3040>

A concrete method of determining the transmitted energy between the grids 3000 and the charging or discharging energy of the power storage unit 3040 is to obtain Pl(t, i, j) and E(t, i, j) satisfying a linear programming problem 2 represented by the following Expression 2, for example. Here, Pl(t, i, j) indicates the magnitude of power transmitted from the grid 3000-$i$ to the grid 3000-$j$ during a period of time t. In addition, E(t, i, j) indicates the stored energy in the power storage unit 3040 the power storage unit ID of which is j and which is included in the grid 3000-$i$ (hereinafter, referred to as the power storage unit 3040-$i$-$j$) at the start of the period of time t. The charging or discharging energy during the period of time t is obtained by subtracting stored energy E(t, i, j) at the period of time t from stored energy E(t+1, i, j) at the period of time t+1. The transmitted energy between the grids 3000 and the charging or discharging energy of the power storage unit 3040 in which a cost required for power transmission is minimized are obtained under the conditions of satisfying the power demand of the grid 3000 during all the period of time t by solving the linear programming problem 2, and setting the stored energy in the power storage unit 3040 to be within an appropriate range. Meanwhile, the same signs in each of expressions in the linear programming problem 2 as those in the linear programming problem 1 indicate the same meaning as those in the linear planning problem 1.

[Expression 2]

$$\text{Minimize} \quad \sum_{1 \le i \le N} \sum_{1 \le j \le N} W(t, i, j) \cdot Pl(t, i, j) \cdot Tp \quad (1)$$

subject to:

$$\sum_{1 \le j \le N} Pl(t, i, j) \cdot Tp + \sum_{1 \le j \le NV(i)} \{E(t+1, i, j) - E(t, i, j)\} - \sum_{1 \le j \le N} Pl(t, j, i) \cdot Tp = Pe(t, i), \quad (2)$$

for $i = 1, 2, \cdots, N, t = 1, 2, \cdots, T$ $$Pl(t, i, j) \le C(i, j), \quad (3)$$

for $i = 1, 2, \cdots, N, j = 1, 2, \cdots, N, t = 1, 2, \cdots, T$ $$LE(i, j) \le E(t, i, j) \le UE(i, j), \quad (4)$$

for $i = 1, 2, \cdots, N, j = 1, 2, \cdots, NV(i), t = 1, 2, \cdots, T$

Similarly to the linear programming problem 1, Expression (1) is an objective function of minimizing the total of power transmission costs. However, Tp in the linear programming problem 2 indicates the length of each period of time t.

Expressions (2) to (4) indicate constraints in the above linear planning problem. First, Expression (2) is a constraint for satisfying the power demand of each grid 3000-$i$. During each period of time t, a value of the supply and demand energy of the grid 3000-$i$ is obtained by subtracting the total of the energy that a grid 3000 receives from the other grids 3000 (that is, demand energy), from the sum of the total of the energy that the grid 3000-$i$ transmits to the other grids 3000 (that is, supply energy) and the total of the energy with which the power storage unit 3040 included in the grid 3000-$i$ is charged. Here, NV(i) indicates the total number of power storage units 3040 included in the grid 3000.

Similarly to Expression (3) of Exemplary embodiment 1, Expression (3) is a constraint for the transmission capacity of the power transmission line 5000.

Expression (4) is a constraint indicating that the stored energy in the power storage unit 3040 is set to be within an appropriate range. Here, LE(i, j) and UE(i, j) indicate the lower limit and the upper limit of the appropriate range of the stored energy in the power storage unit 3040-$i$-$j$, respectively. Here, the values of LE(i, j) and UE(i, j) are determined from the appropriate range information that the appropriate range information receiver unit 2070 receives. For example, when the appropriate range information is implemented with the appropriate range table 600 shown in FIG. 9, the value of the lower limit 606 in a record of the grid ID 602=i and the power storage unit ID 604=j is used as LE(i, j), and the value of the upper limit 608 in that is used as UE(i, j).

As a concrete method of solving the linear programming problem 2, similarly to the linear programming problem 1, there is a method of using a known algorithm such as the simplex method, for example.

<Flow of Grid Control Instruction Generation Process>

Figure 11:
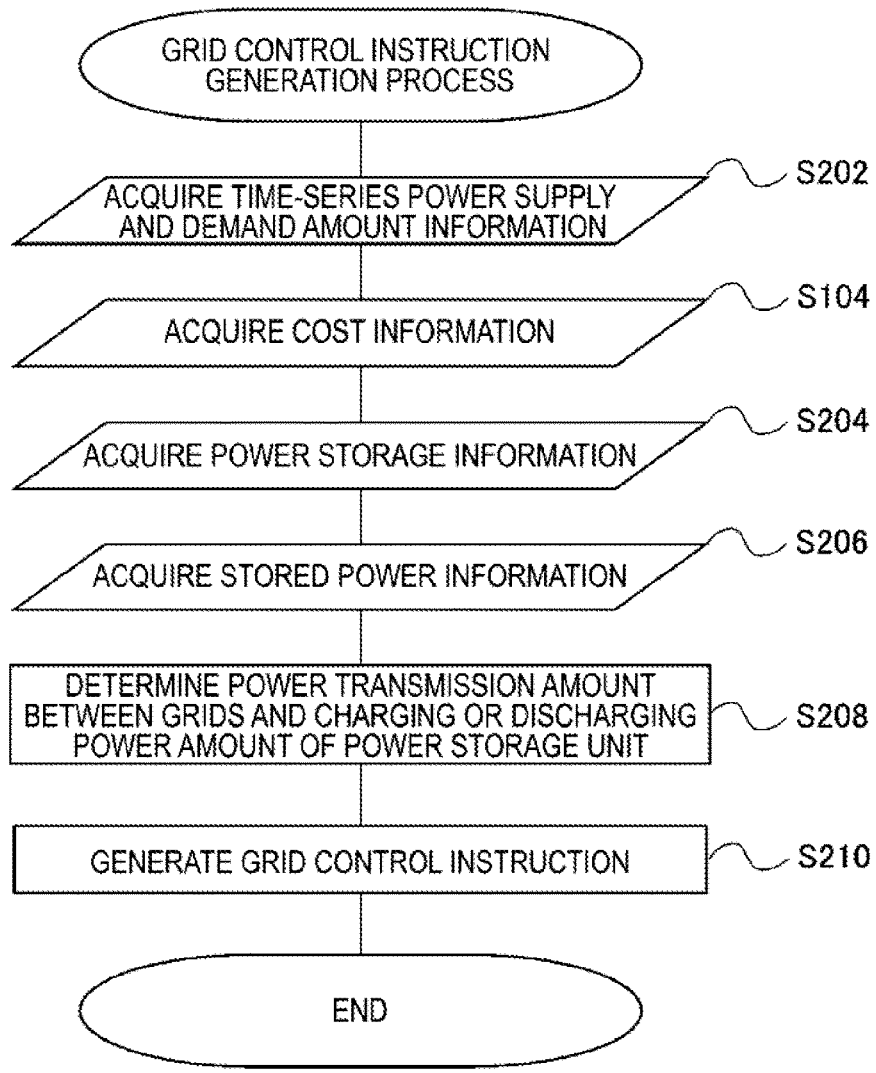
FIG. 11 is a flowchart illustrating a flow of a power transmission control instruction generation process according to Exemplary embodiment 2.

FIG. 11 illustrates a flow of a grid control instruction generation process in Exemplary embodiment 2. Here, in FIG. 11, steps having the same numerals as in FIG. 5 perform the similar processes of FIG. 5, and thus the description thereof will not be repeated.

First, in step S202, the grid control instruction generation unit 2020 receives the time-series supply and demand energy information. Next, in step S104, the cost information is received. Next, in step S204, the stored power information is received. In step S206, the appropriate range information is received.

In step S208, the transmitted energy between the grids 3000 and the charging or discharging energy of the power storage unit 3040 are obtained. The concrete method is to solve the above-mentioned linear programming problem 2, for example.

Figure 4:
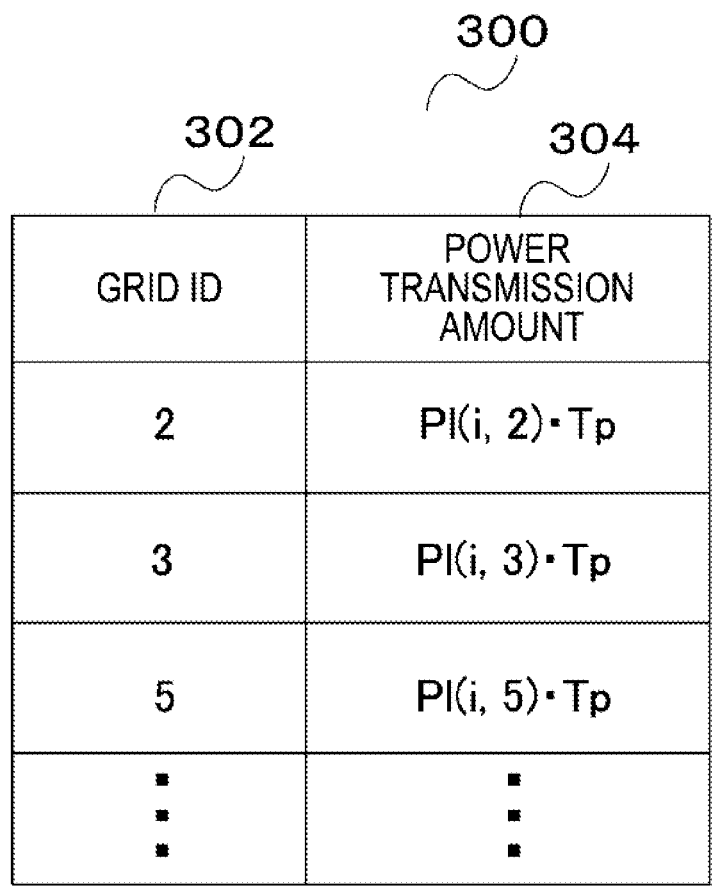
FIG. 4 is a diagram illustrating a configuration of a power transmission control table.
Figure 10:
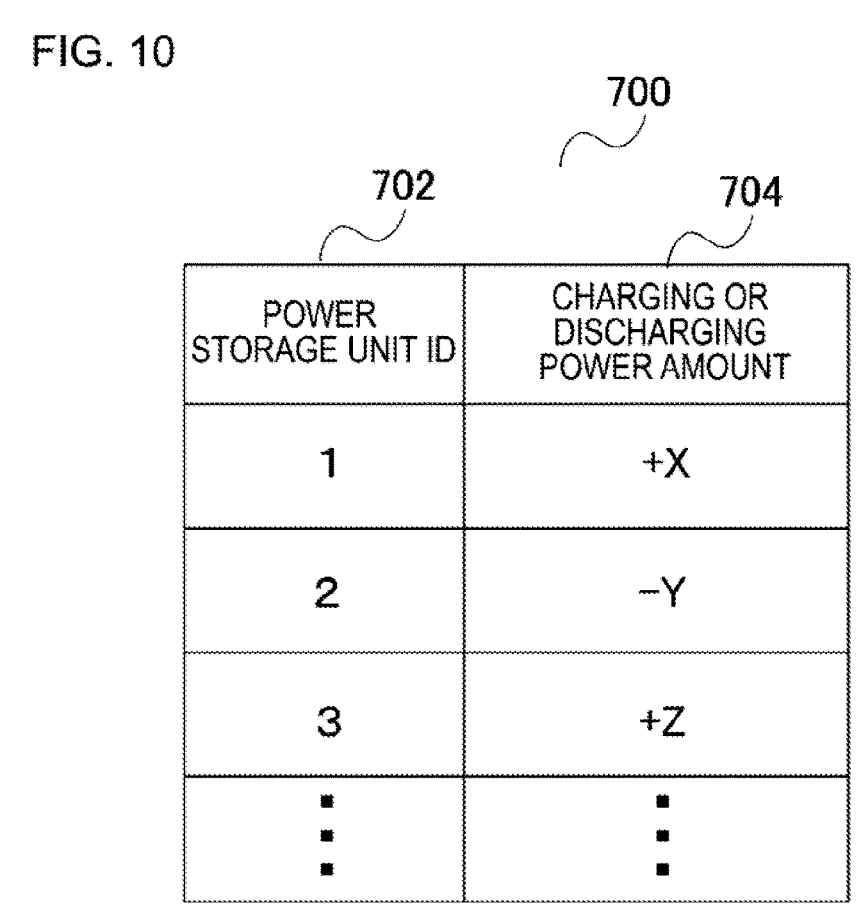

Finally, in step S210, a grid control instruction is generated on the basis of the transmitted energy between the grids 3000 and the charging or discharging energy of the power storage unit 3040 which are obtained in step S208. Specifically, for example, during each period of time, the power transmission control table 300 shown in FIG. 4 is generated on the basis of the transmitted energy between the grids 3000, and the charging or discharging control table 700 shown in FIG. 10 is generated on the basis of the charging or discharging energy of the power storage unit 3040. For example, in order to transmit power from the grid 3000-*i* to the grid 3000-*j* during the period of time t, the power transmission control table 300 having a record of the grid ID 302=j and the transmitted energy 304=Pl(t, i, j)·Tp is generated. In addition, in order to control the charging or discharging of the power storage unit 3040-*i*-*j* during the period of time t, the charging or discharging control table 700 having a record of the power storage unit ID 702=j and the charging or discharging energy 704={E(t+1, i, j)−E(t, i, j)} is generated for the grid 3000-*i*.

<Power Transmission Process and Charging or Discharging Process of Grid Control Unit 3020>

The grid control unit 3020 controls the power transmission and reception unit 3050 and the power storage unit 3040 in accordance with the grid control instruction received from the grid control instruction generation unit 2020. As described above, the power transmission control instruction in the present exemplary embodiment is implemented with the charging or discharging control table 700 and the power transmission control table 300, for example. Here, a power transmission process based on the power transmission control table 300 is the same as that in Exemplary embodiment 1, and thus the description thereof will not be repeated.

The grid control unit 3020 refers to each record of the charging or discharging control table 700, and charges or discharges the power storage unit 3040 having an ID indicated by the power storage unit ID 702 within a time Tp in accordance with the value of the charging or discharging energy 704. For example, when the value of the charging or discharging energy 704 is positive, power the amount of which is indicated by the value of the charging or discharging energy 704 is transmitted from the power transmission and reception unit 3050 to the power storage unit 3040, and the power storage unit 3040 is charged. On the contrary, when the value of the charging or discharging energy 704 is negative, power the amount of which is indicated by the absolute value of the value of the charging or discharging energy 704 is discharged from the power storage unit 3040, and is transmitted to the power transmission and reception unit 3050.

The grid control instruction generation unit 2020 may transmit the grid control instruction for each of multiple periods of time at the start of each period of time, and may transmit the instruction at once. When the grid control instruction generation unit 2020 transmits the grid control instruction at the start of each period of time, the grid control unit 3020 controls the power transmission and reception unit 3050 and the power storage unit 3040 at each time when the grid control instruction is received. When the grid control instruction generation unit 2020 once transmits the grid control instruction at the multiple periods of time, the grid control unit 3020 monitors the elapsed time to detect the start of each period of time, and controls the power transmission and reception unit 3050 and the power storage unit 3040 at the start of each period of time.

<Operational Advantages of Exemplary Embodiment 2>

With the above configuration, according to the present exemplary embodiment, when at least one or more grids 3000 include one or more power storage units 3040, the condition of the stored energy of all the power storage units 3040 being within an appropriate range is further satisfied while satisfying the power demand of each grid 3000, and then it is possible to reduce a cost required for power transmission. By setting the stored energy in the power storage unit 3040 to be within an appropriate range, it is achieved to avoid causing the shortage of power supply from a grid 3000 to the consumer 7000 or other grids 3000, and to avoid wasting the power caused when the power received by the grid 3000 is not able to be completely consumed.

[Exemplary Embodiment 3]

<Outline>

Figure 12:
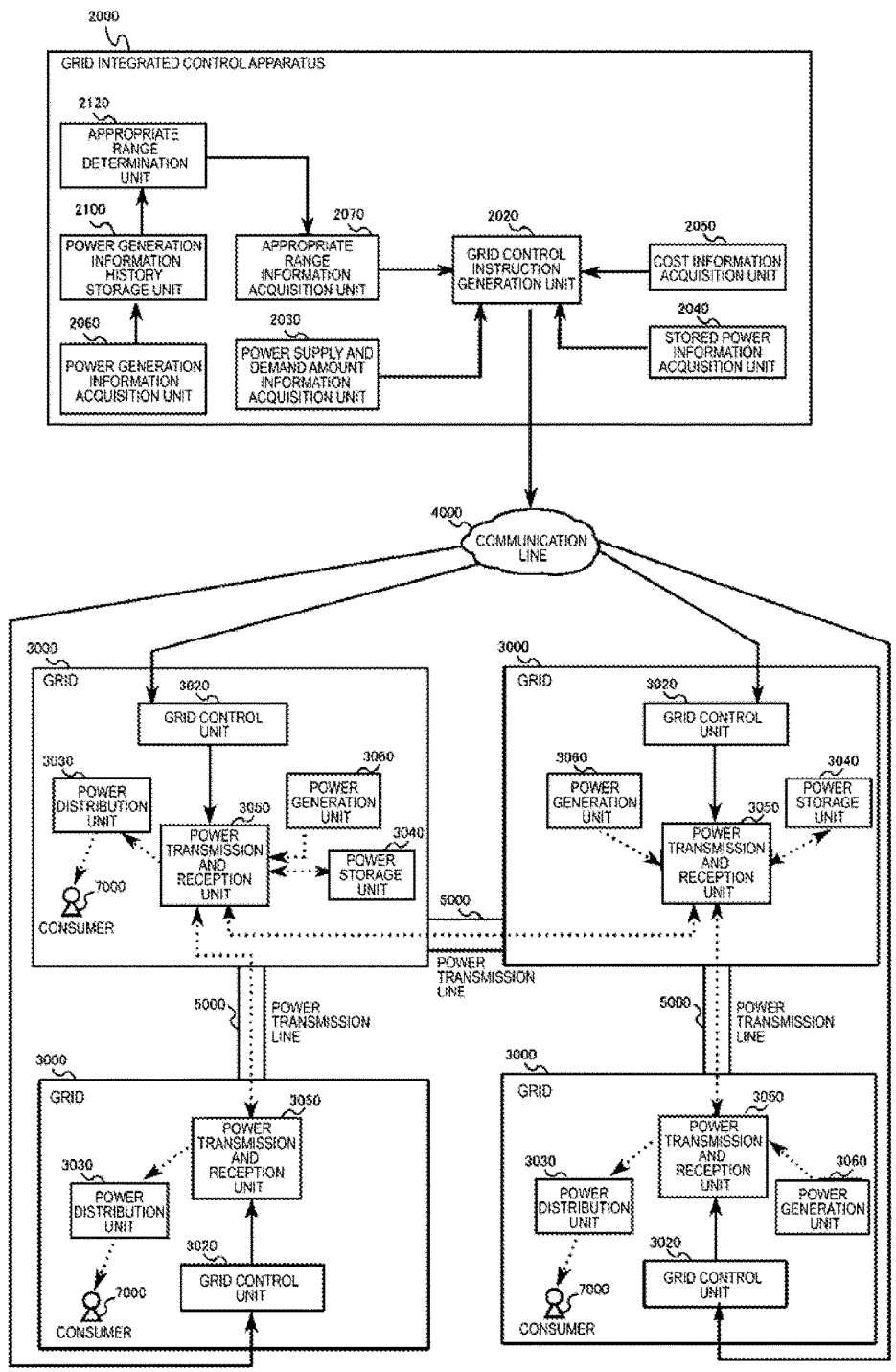
FIG. 12 is a block diagram illustrating a grid integrated control apparatus according to Exemplary embodiment 3 along with the usage environment thereof.

FIG. 12 is a diagram illustrating a grid integrated control apparatus 2000 according to Exemplary embodiment 3 along with the usage environment thereof. Here, in FIG. 12, functional blocks assigned the same numerals as in FIG. 1 or 6 have the same functions as those of the functional blocks shown in FIG. 1 or 6, unless particularly described, and thus the description thereof will not be repeated. In addition, the meaning of arrows is the same as in FIGS. 1 and 6.

At least one of the grids 3000 controlled by the grid integrated control apparatus 2000 according to Exemplary embodiment 3 includes a power generation unit 3060 that generates electrical power. The power generation unit 3060 is a power generator that generates power using renewable energy, for example. A concrete example is a photovoltaic power generator, a wind power generator, or the like.

The grid integrated control apparatus 2000 according to Exemplary embodiment 3 monitors the energy generated by the power generation unit 3060, and determines the appropriate range of the stored energy in the power storage unit 3040 in accordance with the generated energy.

The grid integrated control apparatus 2000 includes a power generation information receiver unit 2060 that receives from the grid 3000 power generation information indicating the energy generated by the power generation unit 3060. In addition, the grid integrated control apparatus 2000 includes a power generation information history storage unit 2100 that stores a power generation information history indicating the generated energy of the power generation unit 3060 for each period of time. The power generation information receiver unit 2060 stores the received generated energy in the power generation information history storage unit 2100 for each period of time.

The grid control instruction generation unit 2020 further determines the appropriate range of the stored energy in the power storage unit 3040 on the basis of the power generation information history. An appropriate range determination unit 2120 is included. A concrete method of determining the appropriate range of the stored energy in the power storage unit 3040 is to determine the range on the basis of an increase or decrease in the generated energy of the power generation unit 3060, for example.

As described above, the grid control instruction generation unit 2020 determines the appropriate range of the stored energy in the power storage unit 3040 on the basis of the generated energy of the power generation unit 3060, and thus it is achieved to avoid causing the waste of power or power shortage.

Hereinafter, the details of the present exemplary embodiment will be described.

<Details of Power Generation Information>

Figure 13:
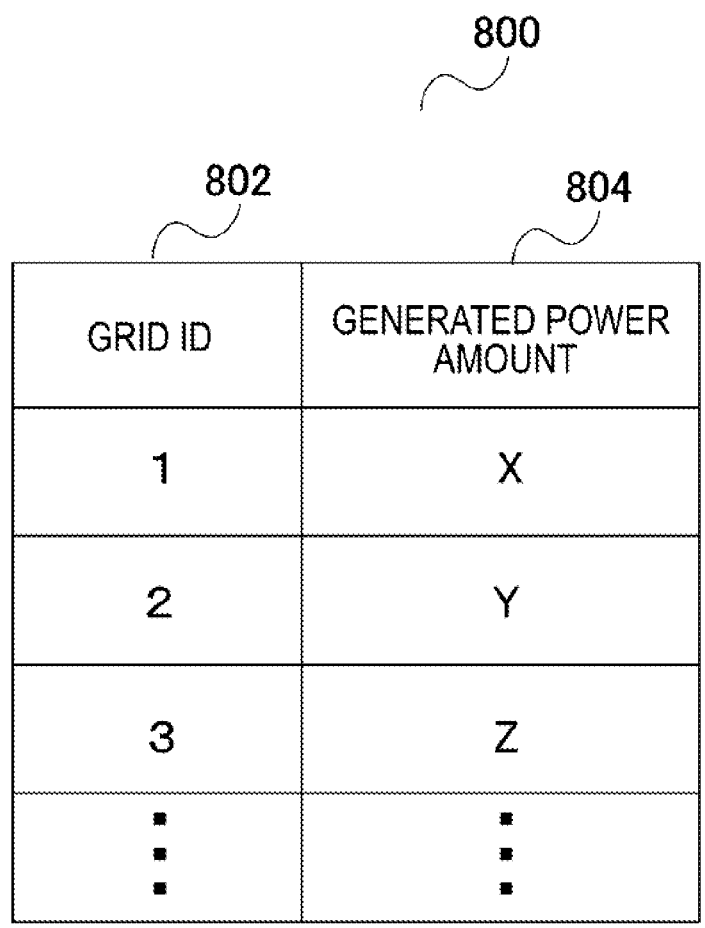
FIG. 13 is a diagram illustrating a configuration of a generated energy table.

The power generation information indicates the generated energy of the power generation unit 3060, and is implemented with a generated energy table 800 shown in FIG. 13, for example. The generated energy table 800 includes a grid ID 802 and a generated energy 804, for example. Here, when the grid 3000-*i* includes a plurality of power generation units 3060, the total of the generated energy of the plurality of power generation units 3060 is set to the generated energy in the grid 3000-$i$, for example.

There are various methods with which the power generation information receiver unit 2060 receives the power generation information. For example, there are a method in which an administrator of the grid integrated control apparatus 2000 manually inputs it, and a method in which it is received from the power generation unit 3060.

<Details of Power Generation Information History>

The power generation information history indicates a history of the generated energy of the power generation unit 3060 for each period of time, and is implemented with a generated energy history table 900 shown in FIG. 14, for example. The generated energy history table 900 includes a grid ID 902 and generated energy for each period of time (generated energy 904 during a period of time 1, generated energy 906 during a period of time 2, and the like), for example.

<Method of Determining Appropriate Range>

For example, a method of determining the stored energy in the power storage unit 3040 on the basis of the generated energy of the power generation unit 3060 is to reduce the upper limit of the appropriate range of the stored energy in the power storage unit 3040 belonging to the same grid 3000 as that of the power generation unit 3060 when the generated energy of the power generation unit 3060 increases, and increasing the lower limit of the stored energy in the power storage unit 3040 belonging to the same grid 3000 as that of the power generation unit 3060 when the generated energy of the power generation unit 3060 is reduced. By reducing the stored energy in the power storage unit 3040 when the generated energy of the power generation unit 3060 increases, it is possible to store the power generated by the power generation unit 3060 into the power storage unit 3040 when the generated energy of the power generation unit 3060 continues to increase. In this manner, it is achieved to avoid causing the waste of power when the generated power cannot be completely consumed. In addition, by increasing the stored energy in the power storage unit 3040 when the generated energy of the power generation unit 3060 reduces, it is possible to supply more power from the power storage unit 3040 when the generated energy of the power generation unit 3060 continues to decrease. By doing so, the power shortage is avoided.

<Flow of Appropriate Range Determination Process>

Figure 15:
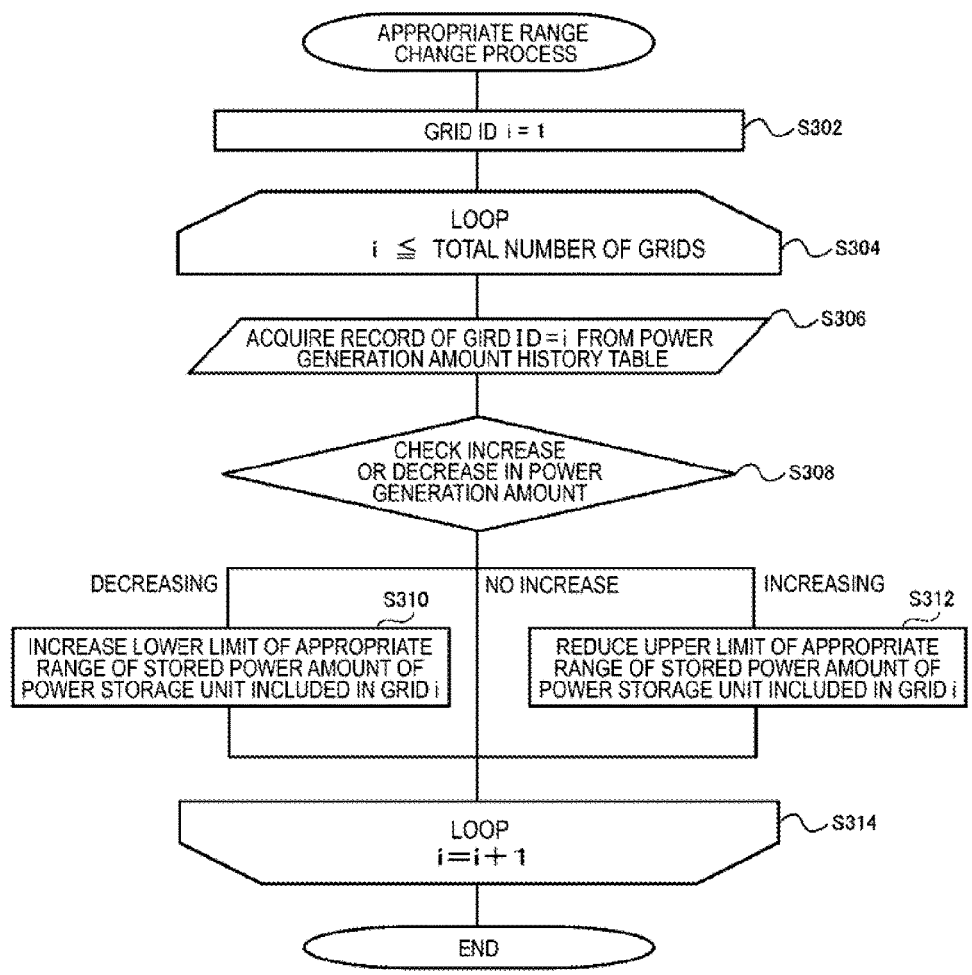
FIG. 15 is a flowchart illustrating a flow of an appropriate range change process.

FIG. 15 illustrates a flow of a process executed by the appropriate range determination unit 2120 to determine the appropriate range of the stored energy in the power storage unit 3040.

First, in step S302, a grid ID i is initialized to 1.

Steps S304 to S314 are a loop process which is performed for each grid 3000-$i$. First, in step S304, it is determined whether i is equal to or less than the total number of grids. When i is smaller than the total number of grids, the process proceeds to step S306. When i is larger than the total number of grids, the process is terminated with respect to all the grids 3000. Therefore, the loop process is terminated, and the appropriate range change process is terminated.

In step S306, the power generation information history of the grid 3000-$i$ is received from the power generation information history storage unit 2100. Specifically, for example, when the power generation information history is implemented with the generated energy history table 900, a record of a grid ID 902=i in the generated energy history table 900 is received.

Next, in step S308, an increase or decrease in the generated energy of the power generation unit 3060 in the grid 3000-$i$ is determined on the basis of the record received in step S306. When the generated energy decreases, the process proceeds to step S310. When the generated energy increases, the process proceeds to step S312. When the generated energy neither increases nor decreases, the process proceeds to step S314.

There are various methods of determining an increase or decrease in generated energy. For example, there is a method of comparing the generated energy at the period of time t with the generated energy at the previous period of time t−1, when a newest period of time is t within the power generation information stored in the power generation information history. Besides, for example, there is also a method of determining a tendency for an increase or decrease in the generated energy by applying a statistical analysis method such as a regression analysis to the generated energy at all the period of time.

Step S310 is the process performed when the generated energy decreases. In step S310, the appropriate range determination unit 2120 increases the lower limit of the appropriate range of the stored energy in the power storage unit 3040 included in the grid 3000-$i$. For example, the appropriate range determination unit 2120 adds a value proportional to the decrement of the generated energy into the lower limit of the above appropriate range. The process proceeds to step S314.

Step S312 is the process performed when the generated energy increases. In step S312, the appropriate range determination unit 2120 reduces the upper limit of the stored energy appropriate range of the power storage unit 3040 included in the grid 3000-$i$. For example, the appropriate range determination unit 2120 subtracts a value proportional to the increment of the generated energy from the upper limit of the above appropriate range. The process proceeds to step S314.

Step S314 is a terminal of the loop process beginning with step S304. After the grid ID i is increased by 1, the process returns to step S304.

In this manner, the appropriate range change process is performed for all the grids 3000 by repeating the processes from step S304 to step S314.

When the grid 3000 includes a plurality of power storage units 3040, the appropriate ranges of all the power storage units 3040 may be changed, or the appropriate ranges of some of the power storage units 3040 may be changed. Suppose that the lower limit of the appropriate range is determined to be increased by X with respect to the grid 3000-$i$ including N power storage units 3040. In this case, there are a method of increasing the lower limit of the appropriate range of one power storage unit 3040 by X, a method of increasing the lower limits of the appropriate ranges of all the power storage units 3040 by X/N, a method of selecting M power storage units 3040 from N power storage units and increasing the lower limit of the appropriate range of the selected power storage unit 3040 by X/M, and the like.

There are various triggers for the appropriate range determination unit 2120 to perform the appropriate range determination process. For example, the appropriate range determination unit 2120 receives an instruction from an administrator of the grid integrated control apparatus 2000, and executes a grid control instruction generation process. In addition, the appropriate range determination unit 2120 may receive a request from the grid 3000, and may execute the appropriate range determination process. Further, the appropriate range determination unit 2120 may repeatedly perform the appropriate range determination process. In this case, for example, the appropriate range determination unit 2120 performs the appropriate range determination process at regular time intervals such as once for an hour. In addition, the appropriate range determination unit 2120 may perform the appropriate range determination process at irregular time intervals such as random time intervals, for example.

<Operational Advantages of Exemplary Embodiment 3>

With the above configuration, according to the present exemplary embodiment, when at least one or more grids 3000 include one or more power storage units 3040, it is achieved to reduce a cost required for power transmission while satisfying the power demand of each grid 3000 and the condition that the stored energy of all the power storage units 3040 is within an appropriate range. By setting the stored energy in the power storage unit 3040 to be within an appropriate range, it is achieved to avoid causing the shortage of power supply in a grid 3000, and to avoid wasting the power caused when the power generated by the power generation unit 3060 is not able to be completely stored. Further, it is achieved to avoid causing the waste and the shortage of power when the generated energy of the power generation unit 3060 changes unexpectedly, by changing the appropriate range of the stored energy in the power storage unit 3040 following a change in the generated energy of the power generation unit 3060.

[Exemplary Embodiment 4]

<Outline>

FIG. 16 is a diagram illustrating a grid integrated control apparatus 2000 according to Exemplary embodiment 4 along with the usage environment thereof. Here, in FIG. 16, functional blocks having the same numerals as those shown in FIG. 1, 6 or 12 have the same functions as those shown in FIG. 1, 6 or 12, unless particularly described, and thus the description thereof will not be repeated. In addition, the internal configuration of the grid 3000 in FIG. 16 is the same as the internal configuration of the grid 3000 in FIG. 6 or 12, for example. Therefore, in FIG. 16, the internal configuration of the grid 3000 will be omitted.

The grid integrated control apparatus 2000 in Exemplary embodiment 4 includes a demand energy receiver unit 2160, a supply energy receiver unit 2180, and a supply and demand energy calculation unit 2140, and calculates the supply and demand energy of each grid 3000 using these functional configurations. The demand energy receiver unit 2160 receives demand energy indicating the energy supplied to each grid 3000 from other grids 3000. The supply energy receiver unit 2180 receives supply energy indicating the energy supplied from each grid 3000 to other grids 3000. The supply and demand energy calculation unit 2140 calculates supply and demand energy indicating a difference between the supply energy received from the supply energy receiver unit 2180 and the demand energy received from the demand energy receiver unit 2160.

The grid control instruction generation unit 2020 determines the transmitted energy between the grids 3000 so as to reduce the total of power transmission costs between the grids 3000 under the conditions of satisfying the power demand of all the grids for which the supply and demand energy is calculated, on the basis of the supply and demand energy calculated by the supply and demand energy calculation unit 2140 and the cost information received by the cost information receiver unit 2050.

<Method of Receiving Demand Energy and Supply Energy>

There are various methods with which the demand energy receiver unit 2160 receives the demand energy and various methods with which the supply energy receiver unit 2180 receives the supply energy. For example, there is a method in which an administrator of the grid integrated control apparatus 2000 manually inputs the energy. In addition, when the demand energy and the supply energy are based on a sales contract between a power supplier and a power consumer, a method of receiving the energy from an external server managing the sales contract is also considered. In terms of the demand energy, a method of receiving the energy from the power distribution unit 3030 is also considered when the demand energy is determined on the basis of the energy distributed from the power distribution unit 3030 to the consumer 7000. In terms of the supply energy, a method of receiving the generated energy from the power generation unit 3060 is also considered when the supply energy is determined on the basis of the energy generated by the power generation unit 3060.

<Operational Advantages>

With the above configuration, according to the present exemplary embodiment, the power transmission of the grid 3000 is controlled so as to reduce the total of costs required for power transmission under the conditions of satisfying the power demand of the grid 3000 on the basis of the supply and demand energy information of each grid 3000 and the cost information of each power transmission line 5000, thereby achieving to reduce costs required for power transmission between the grids 3000. In addition, since the grid integrated control apparatus 2000 has a function of calculating the supply and demand energy, it is not necessary for an administrator or an external apparatus to calculate the supply and demand energy, and thus the grid integrated control apparatus 2000 can be used more easily.

[Exemplary Embodiment 5]

<Outline>

FIG. 17 is a diagram illustrating a grid control system 8000 according to Exemplary embodiment 5 along with the usage environment thereof. Here, in FIG. 17, functional configuration units having the same numerals as in FIG. 1, 6 or 16 have the same functions as those of the functional configuration units assigned the same numerals shown in the drawings, and thus the description thereof will not be repeated. In addition, in order to avoid the complication of the drawing, only one combination of the grid 3000 and the grid control apparatus 6000 is shown.

The grid control system 8000 includes the grid integrated control apparatus 2000 and two or more grid control apparatuses 6000. The grid integrated control apparatus 2000 determines the transmitted energy between the grids 3000 so that costs required for power transmission between the grids 3000 are minimized while satisfying the power demand of the grid 3000, on the basis of the supply and demand energy information and the cost information. Here, the grid integrated control apparatus 2000 in the present exemplary embodiment receives supply and demand energy information from the grid control apparatus 6000. The grid integrated control apparatus 2000 transmits a grid control instruction to the grid control apparatuses 6000 on the basis of the determined transmitted energy between each grid 3000.

The grid control apparatus 6000 includes a grid control unit 6020, and controls one grid 3000. The grid control unit 6020 controls the power transmission of the grid 3000 on the basis of the grid control instruction received from the grid integrated control apparatus 2000.

The grid control apparatus 6000 includes a demand energy receiver unit 6040, a supply energy receiver unit 6060 and a supply and demand energy calculation unit 6080, and calculates the supply and demand energy based on the demand energy and the supply energy. The demand energy receiver unit 6040 receives the demand energy of the grid 3000. The supply energy receiver unit 6060 receives the supply energy of the grid 3000. The supply and demand energy calculation unit 6080 calculates the supply and demand energy indicating a difference between the supply energy received by the supply energy receiver unit 6060 and the demand energy received by the demand energy receiver unit 6040.

As described above, the grid control system 8000 calculates the supply and demand energy of the grid 3000 in order to notify the grid integrated control apparatus 2000 of the calculated energy, using the grid control apparatus 6000. The grid integrated control apparatus 2000 controls the power transmission of the grid 3000 so as to reduce the total of costs required for power transmission under the conditions of satisfying the power demand of the grid 3000, on the basis of the cost information and the supply and demand energy received from the grid control apparatus 6000, thereby achieving to reduce costs required for power transmission between the grids 3000.

Hereinafter, the details of the present exemplary embodiment will be described.

The grid control apparatus 6000 and the grid 3000 may be connected to each other through the same communication line 4000 which is the same as that connecting the grid control apparatus 6000 to the grid integrated control apparatus 2000, and may be connected to the each other through a different communication line 4000 from that.

There are various methods with which the demand energy receiver unit 6040 receives the demand energy. For example, the method is the same as that with which the demand energy receiver unit 2160 in Exemplary embodiment 4 receives the demand energy.

There are various methods with which the supply energy receiver unit 6060 receives the supply energy. For example, the method is the same as that with which the supply energy receiver unit 2180 in Exemplary embodiment 4 receives the supply energy.

The grid control instruction generation unit 2020 generates a grid control instruction for controlling the power transmission of the grid 3000. A generation method thereof is the method of generating a grid control instruction in accordance with the flow shown in FIG. 5, similarly to the grid control instruction generation unit 2020 in Exemplary embodiment 1, for example.

The grid control unit 6020 controls the power transmission of the grid 3000 on the basis of the grid control instruction received from the grid control instruction generation unit 2020. Specifically, for example, a control signal for changing the operation of the power transmission and reception unit 3050 is transmitted to the power transmission and reception unit 3050 so that the power transmission and reception unit 3050 transmits power of the above transmitted energy to the above power transmission destination grid 3000, on the basis of a combination of the transmitted energy and the power transmission destination grid 3000 designated by the grid control instruction.

<Operational Advantages>

With the above configuration, according to the present exemplary embodiment, in the grid control system 8000, the grid control apparatus 6000 calculates the supply and demand energy of the grid 3000 in order to notify the grid integrated control apparatus 2000 of the calculated energy, and the grid integrated control apparatus 2000 controls the power transmission of the grid 3000 so as to reduce the total of costs required for power transmission under the condition of satisfying the power demand of the grid 3000, on the basis of the supply and demand energy received from the grid control apparatus 6000 and the cost information received by the cost information receiver unit 2050, thereby achieving to reduce costs required for power transmission between the grids 3000.

As described above, although the exemplary embodiments of the present invention have been set forth with reference to the drawings, they are merely illustrative of the present invention, and the aforementioned combinations and various configurations other than those stated above can be adopted.

Hereinafter, examples of reference forms are appended.

1. A grid integrated control apparatus that controls a plurality of grids which are arranged dispersedly, wherein each of the grids includes a power transmission and reception unit that transmits and receives power between the grid and the other grid through a power transmission line, and a grid control unit that controls the power transmission and reception unit on the basis of a control instruction which is received from the grid integrated control apparatus connected through a communication line, at least one of the grids includes a distribution unit that distributes power to a consumer consuming power, and the grid integrated control apparatus comprises:

a supply and demand energy information receiver unit that, regarding each of the grids, receives supply and demand energy information having supply and demand energy indicating a difference between energy supplied to the other grid by the grid and energy supplied from the other grid to the grid;

a cost information receiver unit that receives cost information indicating a cost involved in power transmission between the grids; and a grid control instruction generation unit determines a combination of: the grid that supplies power; the grid that receives power; and transmitted energy, on the basis of the supply and demand energy information received by the supply and demand energy information receiver unit and the cost information received by the cost information receiver unit, generates the control instruction for controlling power transmission of each of the grids on the basis of the determined combination, and transmits the control instruction to each of the grids.

2. The grid integrated control apparatus according to 1, wherein a cost shown by the cost information is determined using a wheeling charge involved in power transmission through the power transmission line.

3. The grid integrated control apparatus according to 1 or 2, wherein the cost shown by the cost information is determined using a power loss due to the power transmission through the power transmission line.

4. The grid integrated control apparatus according to any one of 1 to 3, wherein the power supply and demand information receiver unit repeatedly receives the supply and demand energy information, and the grid control instruction generation unit generates and transmits the control instruction whenever the supply and demand energy information receiver unit receives the supply and demand energy information.

5. The grid integrated control apparatus according to any one of 1 to 4, wherein at least one or more of the grids include a power storage unit which is capable of storing power, and the grid control unit charges and discharges the power storage unit on the basis of a control instruction which is received from the grid integrated control apparatus, the grid integrated control apparatus comprises:

a stored power information receiver unit that receives stored power information indicating a stored energy in the power storage unit; and an appropriate range information receiver unit that receives appropriate range information indicating an appropriate range of the stored energy in the power storage unit, the supply and demand energy information has the supply and demand energy for each of the grids at each of a plurality of periods of time, and the grid control instruction generation unit receives the stored power information of the power storage unit from the stored power information receiver unit, receives the appropriate range information of the power storage unit from the appropriate range receiver unit, determines a combination of the grid which is a power transmission source, the grid which is a power transmission destination, and transmitted energy, and energy with which each of the power storage units is charged and discharged, at each period of time, on the basis of the supply and demand energy information, the stored power information and the appropriate range information, and generates the control instruction for controlling the power transmission of each of the grids and the charging or discharging of the power storage unit, on the basis of the determined combination, and transmits the generated instruction to each of the grids.

6. The grid integrated control apparatus according to 5, wherein at least one of the grids includes a power generation unit that generates power, and the grid integrated control apparatus further comprises:

a power generation information receiver unit that receives power generation information indicating generated energy of the power generation unit; and an appropriate range determination unit that receives the power generation information from the power generation information receiver unit, at each of two or more periods of time, with respect to the grid including both the power storage unit and the power generation unit, and determines the appropriate range of the stored energy in the power storage unit on the basis of the received power generation information.

7. The grid integrated control apparatus according to 6, wherein in the determination of the appropriate range of the stored energy, the appropriate range determination unit reduces an upper limit of the appropriate range of the stored energy in the power storage unit included in the same grid as to which the power generation unit having an increase in generated energy belongs to, on the basis of the power generation information at the plurality of periods of time, and increases a lower limit of the appropriate range of the stored energy in the power storage unit included in the same grid as to which the power generation unit having a reduction in generated energy belongs to.

8. The grid integrated control apparatus according to 6 or 7, wherein the appropriate range determination unit repeatedly performs the determination of the appropriate range of the stored energy.

9. The grid integrated control apparatus according to any one of 1 to 8, further comprising:

a demand energy receiver unit that receives demand energy indicating the energy supplied from the other grid to the grid;

a supply energy receiver unit that receives supply energy indicating the energy supplied to the other grid by the grid; and a supply and demand energy calculation unit that calculates supply and demand energy indicating a difference between the demand energy which is received by the demand energy receiver unit and the supply energy which is received by the supply energy receiver unit, wherein the supply and demand energy information receiver unit receives the supply and demand energy which is calculated by the supply and demand energy calculation unit.

10. A grid control system comprising:

a grid control apparatus; and a grid integrated control apparatus that controls a plurality of the grid control apparatuses, wherein the grid is connected to at least one or more other grids through a power transmission line, and includes a power transmission and reception unit that transmits and receives power between the grid and the other grid through the power transmission line, at least one of the grids includes a distribution unit that distributes power to a consumer consuming power, the grid control apparatus includes a demand energy receiver unit that receives demand energy indicating the energy supplied from the other grid to the grid, a supply energy receiver unit that receives supply energy indicating the energy supplied to the other grid by the grid, a supply and demand energy information generation unit generates supply and demand energy information having supply and demand energy indicating a difference between the supply energy which is received by the supply energy receiver unit and the demand energy which is received by the demand energy receiver unit, and transmits the generated information to the grid integrated control apparatus, and a grid control unit that controls the power transmission and reception unit in accordance with an instruction from the grid integrated control apparatus which is connected through a communication line, and the grid integrated control apparatus includes a supply and demand energy information receiver unit that receives the supply and demand energy information from each of the grid control apparatuses, a cost information receiver unit that receives cost information indicating a cost involved in power transmission between the grids, and a grid control instruction generation unit that determines a combination of: the grid that supplies power; the grid that receives power; and transmitted energy, on the basis of the supply and demand energy information which is received by the supply and demand energy information receiver unit and the cost information which is received by the cost information receiver unit, and transmits an instruction to each of the grid control apparatuses on the basis of the determined combination.

11. The grid control system according to 10, wherein a cost shown by the cost information is determined using a wheeling charge involved in power transmission through the power transmission line.

12. The grid control system according to 10 or 11, wherein the cost shown by the cost information is determined using a power loss due to the power transmission through the power transmission line.

13. The grid control system according to any one of 10 to 12,
wherein the power supply and demand information generation unit repeatedly generates the supply and demand energy information,
the power supply and demand information receiver unit receives the supply and demand energy information whenever the supply and demand energy information generation unit generates the supply and demand energy information, and
the grid control instruction generation unit generates and transmits the control instruction whenever the supply and demand energy information receiver unit receives the supply and demand energy information.

14. The grid control system according to any one of 10 to 13,
wherein at least one or more of the grids includes a power storage unit which is capable of storing power, and the grid control unit charges and discharges the power storage unit on the basis of a control instruction which is received from the grid integrated control apparatus,
the grid integrated control apparatus includes
a stored power information receiver unit that receives stored power information indicating a stored energy in the power storage unit, and
an appropriate range information receiver unit that receives appropriate range information indicating an appropriate range of the stored energy in the power storage unit,
the supply and demand energy information has the supply and demand energy for each of the grids at each of a plurality of periods of time, and
the grid control instruction generation unit
determines a combination of the grid which is a power transmission source, the grid which is a power transmission destination, and transmitted energy, and energy with which each of the power storage units is charged and discharged, at each period of time, on the basis of the supply and demand energy information, the stored power information which is received from the stored power information receiver unit, and the appropriate range information which is received from the appropriate range receiver unit, and
generates the control instruction for controlling the power transmission of each of the grids and the charging or discharging of the power storage unit, on the basis of the determined combination, and transmits the generated instruction to each of the grids.

15. The grid control system according to 14,
wherein at least one of the grids includes a power generation unit that generates power, and
the grid integrated control apparatus includes
a power generation information receiver unit that receives power generation information indicating generated energy of the power generation unit, and
an appropriate range determination unit that receives the power generation information from the power generation information receiver unit, at each of two or more periods of time, with respect to the grid including both the power storage unit and the power generation unit, and determines the appropriate range of the stored energy in the power storage unit on the basis of the received power generation information.

16. The grid control system according to 15, wherein in the determination of the appropriate range of the stored energy, the appropriate range determination unit reduces an upper limit of the appropriate range of the stored energy in the power storage unit included in the same grid as to which the power generation unit having an increase in generated energy belongs to, on the basis of the power generation information at the plurality of periods of time, and increases a lower limit of the appropriate range of the stored energy in the power storage unit included in the same grid as to which the power generation unit having a reduction in generated energy belongs to.

17. The grid control system according to 15 or 16, wherein the appropriate range determination unit repeatedly performs the determination of the appropriate range of the stored energy.

18. A grid control system comprising:
a grid control apparatus that controls a grid; and
a grid integrated control apparatus that controls a plurality of the grid control apparatuses,
wherein the grid is connected to the grid integrated control apparatus through a communication line, is connected to at least one or more other grids through a power transmission line, and includes a power transmission and reception unit that transmits and receives power between the grid and the other grid through the power transmission line,
at least one of the grids includes a distribution unit that distributes power to a consumer consuming power,
the grid control apparatus includes a grid control unit that controls the power transmission and reception unit in accordance with an instruction from the grid integrated control apparatus which is connected through a communication line, and
the grid integrated control apparatus includes
a demand energy receiver unit that receives demand energy indicating the energy supplied from the other grid to the grid,
a supply energy receiver unit that receives supply energy indicating the energy supplied to the other grid by the grid,
a supply and demand energy calculation unit that calculates supply and demand energy indicating a difference between the supply energy which is received by the supply energy receiver unit and the demand energy which is received by the demand energy receiver unit,
a cost information receiver unit that receives cost information indicating a cost involved in power transmission between the grids, and
determines a combination of: the grid that supplies energy power; the grid that receives power; and transmitted energy, on the basis of the supply and demand energy which is received from the supply and demand energy calculation unit and the cost information which is received from the cost information receiver unit, and transmits an instruction to each of the grid control apparatuses on the basis of the determined combination.

19. The grid control system according to 18, wherein a cost shown by the cost information is determined using a wheeling charge involved in power transmission through the power transmission line.

20. The grid control system according to 18 or 19, wherein the cost shown by the cost information is determined using a power loss due to the power transmission through the power transmission line.

21. The grid control system according to any one of 18 to 20,
wherein the supply and demand energy calculation unit repeatedly calculates the supply and demand energy and transmits the resultant to the grid integrated control apparatus, and
the grid control instruction generation unit generates and transmits the control instruction whenever the grid integrated control apparatus receives the supply and demand energy.

22. The grid control system according to any one of 18 to 21, wherein at least one or more of the grids includes a power storage unit which is capable of storing power, and the grid control unit charges and discharges the power storage unit on the basis of a control instruction which is received from the grid integrated control apparatus, the grid integrated control apparatus includes a stored power information receiver unit that receives stored power information indicating a stored energy in the power storage unit, and an appropriate range information receiver unit that receives appropriate range information indicating an appropriate range of the stored energy in the power storage unit, the supply and demand energy information has the supply and demand energy for each of the grids at each of a plurality of periods of time, and the grid control instruction generation unit receives the stored power information of the power storage unit from the stored power information receiver unit, receives the appropriate range information of the power storage unit from the appropriate range receiver unit, determines a combination of: the grid that supplies power; the grid that receives power; and transmitted energy, and energy with which each of the power storage units is charged and discharged, at each period of time, on the basis of the supply and demand energy, the stored power information and the appropriate range information, and generates the control instruction for controlling the power transmission of each of the grids and the charging or discharging of the power storage unit, on the basis of the determined combination, and transmits the generated instruction to each of the grids.

23. The grid control system according to 22, wherein at least one of the grids includes a power generation unit that generates power, and the grid integrated control apparatus includes a power generation information receiver unit that receives power generation information indicating generated energy of the power generation unit, and an appropriate range determination unit that receives the power generation information from the power generation information receiver unit, at each of two or more periods of time, with respect to the grid including both the power storage unit and the power generation unit, and determines the appropriate range of the stored energy in the power storage unit on the basis of the received power generation information.

24. The grid control system according to 23, wherein in the determination of the appropriate range of the stored energy, the appropriate range determination unit reduces an upper limit of the appropriate range of the stored energy in the power storage unit included in the same grid as to which the power generation unit having an increase in generated energy belongs to, on the basis of the power generation information at the plurality of periods of time, and increases a lower limit of the appropriate range of the stored energy in the power storage unit included in the same grid as to which the power generation unit having a reduction in generated energy belongs to.

25. The grid control system according to 23 or 24, wherein the appropriate range determination unit repeatedly performs the determination of the appropriate range of the stored energy.

26. A grid control apparatus that controls a grid, wherein the grid is connected to at least one or more other grids through a power transmission line, and includes a power transmission and reception unit that transmits and receives power between the grid and the other grid through the power transmission line, at least one of the grids includes a distribution unit that distributes power to a consumer consuming power, and the grid control apparatus comprises:

a demand energy receiver unit that receives demand energy indicating the energy supplied from the other grid to the grid;

a supply energy receiver unit that receives supply energy indicating the energy supplied to the other grid by the grid;

a supply and demand energy calculation unit that calculates supply and demand energy indicating a difference between the supply energy which is received by the supply energy receiver unit and the demand energy which is received by the demand energy receiver unit; and a grid control unit which controls the power transmission and reception unit in accordance with an instruction from the grid integrated control apparatus, connected to the grid control apparatus through a communication line, which determines a combination of the grid which is a transmission source, the grid which is a transmission destination, and transmitted energy, on the basis of the supply and demand energy which is received from the grid control apparatus.

27. The grid control apparatus according to 26, wherein the grid integrated control apparatus transmits an instruction to the grid control apparatus whenever the supply and demand energy is received, and the supply and demand energy calculation unit repeatedly calculates the supply and demand energy and transmits the resultant to the grid integrated control apparatus.

28. A program causing a computer to have a function of operating as a grid integrated control apparatus that controls a plurality of grids which are arranged dispersedly, wherein each of the grids is connected to at least one or more other grids through a power transmission line, transmits and receives power between the grid and the other grid through the power transmission line, and controls the transmission and reception of the power on the basis of a control instruction which is received from the computer connected through a communication line, and the program causes the computer to have:

a function of, regarding each of the grids, receiving supply and demand energy information having supply and demand energy indicating a difference between energy supplied to the other grid by the grid and energy supplied from the other grid to the grid;

a function of receiving cost information indicating a cost involved in power transmission between the grids; and a function of determining a combination of: the grid that supplies power; the grid that receives power; and transmitted energy, on the basis of the supply and demand energy information and the cost information, generating a control instruction for controlling the power transmission of each of the grids on the basis of the determined combination, and transmits the control instruction to each of the grids.

29. The program according to 28, causing the computer to further have:

a function of repeatedly receiving the supply and demand energy information; and a function of generating and transmitting the control instruction whenever the supply and demand energy information is received.

30. The program according to 28 or 29, wherein at least one or more of the grids includes a power storage unit which is capable of storing power, and the grid control unit charges and discharges the power storage unit on the basis of a control instruction which is received from the computer, and the program causes the computer to further have:

a function of receiving stored power information indicating the stored energy in the power storage unit;

a function of receiving appropriate range information indicating an appropriate range of the stored energy in the power storage unit;

a function of receiving the supply and demand energy information having the supply and demand energy for each of the grids at each of a plurality of periods of time;

a function of determining a combination of: the grid that supplies power; the grid that receives power; and transmitted energy, and energy with which each of the power storage units is charged and discharged, at each period of time, on the basis of the supply and demand energy information, the stored power information and the appropriate range information; and a function of generating the control instruction for controlling the power transmission of each of the grids and the charging or discharging of the power storage unit, on the basis of the determined combination, and transmitting the generated instruction to each of the grids.

31. The program according to 30, wherein at least one of the grids includes a power generation unit that generates power, and the program causes the computer to further have:

a function of receiving power generation information indicating generated energy of the power generation unit; and a function of determining the appropriate range of the stored energy in the power storage unit on the basis of the received power generation information, at each of two or more periods of time, with respect to the grid including both the power storage unit and the power generation unit.

32. The program according to 31, causing the computer to further have a function of, in the determination of the appropriate range of the stored energy, reducing an upper limit of the appropriate range of the stored energy in the power storage unit included in the same grid as to which the power generation unit having an increase in generated energy belongs to, on the basis of the power generation information at the plurality of periods of time, and increasing a lower limit of the appropriate range of the stored energy in the power storage unit included in the same grid as to which the power generation unit having a reduction in generated energy belongs to.

33. The program according to 31 or 32, causing the computer to have a function of repeatedly performing the determination of the appropriate range of the stored energy.

34. The program according to any one of 28 to 33, causing the computer to further have:

a function of receiving demand energy indicating the energy supplied from the other grid to the grid;

a function of receiving supply energy indicating the energy supplied to the other grid by the grid; and a function of calculating supply and demand energy indicating a difference between the demand energy and the supply energy.

35. A program causing a grid control system including a grid control apparatus and a grid integrated control apparatus to have a function of controlling a grid, wherein the grid integrated control apparatus and the grid control apparatus are connected to each other through a communication line, the grid is connected to the grid control apparatus through a communication line, is connected to at least one or more other grids through a power transmission line, and includes a power transmission and reception unit that transmits and receives power between the grid and the other grid through the power transmission line, the program causes the grid integrated control apparatus to have:

a function of receiving demand energy indicating the energy supplied from the other grid to the grid;

a function of receiving supply energy indicating the energy supplied to the other grid by the grid;

a function of calculating supply and demand energy indicating a difference between the supply energy and the demand energy;

a function of receiving cost information indicating a cost involved in power transmission between the grids; and a function of determining a combination of the grid which is a power transmission source, the grid of which is a power transmission destination, an transmitted energy, on the basis of the supply and demand energy and the cost information, and transmitting an instruction to each of the grid control apparatuses on the basis of the determined combination, and the program causes the grid control apparatus to function of controlling the power transmission and reception unit in accordance with an instruction from the grid integrated control apparatus.

36. The program according to 35, causing the grid integrated control apparatus to further have a function of repeatedly calculating the supply and demand energy and a function of generating and transmitting the control instruction whenever the supply and demand energy is calculated.

37. The program according to 35 or 36, wherein at least one or more of the grids includes a power storage unit which is capable of storing power, and the grid control unit charges and discharges the power storage unit on the basis of a control instruction which is received from the grid integrated control apparatus, the program causes the grid integrated control apparatus to further have:

a function of receiving stored power information indicating the stored energy in the power storage unit;

a function of receiving appropriate range information indicating an appropriate range of the stored energy in the power storage unit;

a function of calculating the supply and demand energy for each of the grids at each of a plurality of periods of time;

a function of determining a combination of: the grid that supplies power; the grid that receives power; and transmitted energy, and energy with which each of the power storage units is charged and discharged, at each period of time, on the basis of the supply and demand energy, the stored power information and the appropriate range information;

a function of transmitting an instruction for controlling the power transmission of the power transmission and reception unit and the charging or discharging of the power storage unit, to the grid control apparatus, on the basis of the determined combination, and the program causes the grid control apparatus to further have a function of controlling the power transmission of the power transmission and reception unit and the charging or discharging of the power storage unit in accordance with the instruction.

38. The program according to 37, wherein at least one of the grids includes a power generation unit that generates power, and the program causes the grid integrated control apparatus to further have:

a function of receiving power generation information indicating generated energy of the power generation unit; and a function of receiving the power generation information from the power generation information receiver unit, at each of two or more periods of time, with respect to the grid including both the power storage unit and the power generation unit, and determining the appropriate range of the stored energy in the power storage unit on the basis of the received power generation information.

39. The program according to 38, causing the grid integrated control apparatus to further have a function of, in the determination of the appropriate range of the stored energy, reducing an upper limit of the appropriate range of the stored energy in the power storage unit included in the same grid as to which the power generation unit having an increase in generated energy belongs to, on the basis of the power generation information at the plurality of periods of time, and increasing a lower limit of the appropriate range of the stored energy in the power storage unit included in the same grid as to which the power generation unit having a reduction in generated energy belongs to.

40. The program according to 38 or 39, causing the grid integrated control system to further have a function of repeatedly performing the determination of the appropriate range of the stored energy.

41. A program causing a grid control system including a grid control apparatus and a grid integrated control apparatus to have a function of controlling a grid, wherein the grid integrated control apparatus and the grid control apparatus are connected to each other through a communication line, the grid is connected to the grid control apparatus through a communication line, is connected to at least one or more other grids through a power transmission line, and includes a power transmission and reception unit that transmits and receives power between the grid and the other grid through the power transmission line, the program causes the grid control apparatus to have:

a function of receiving demand energy indicating the energy supplied from the other grid to the grid;

a function of receiving supply energy indicating the energy supplied to the other grid by the grid;

a function of calculating supply and demand energy indicating a difference between the supply energy and the demand energy and transmitting the calculated energy to the grid integrated control apparatus; and a function of controlling the power transmission and reception unit in accordance with an instruction from the grid integrated control apparatus, and the program causes the grid integrated control apparatus to have a function of receiving cost information indicating a cost involved in power transmission between the grids, and a function of determining a combination of the grid which is a power transmission source, the grid of which is a power transmission destination, an transmitted energy, on the basis of the supply and demand energy and the cost information, and transmitting an instruction to each of the grid control apparatuses on the basis of the determined combination.

42. The program according to 41, causing the grid control apparatus to further have a function of repeatedly calculating the supply and demand energy and transmitting the calculated energy to the grid integrated control apparatus, and causing the grid integrated control apparatus to further have a function of generating and transmitting the control instruction whenever the supply and demand energy is received.

43. The program according to 41 or 42, wherein at least one or more of the grids includes a power storage unit which is capable of storing power, and the grid control unit charges and discharges the power storage unit on the basis of a control instruction which is received from the grid integrated control apparatus, the program causes the grid integrated control apparatus to further have:

a function of receiving stored power information indicating the stored energy in the power storage unit;

a function of receiving appropriate range information indicating an appropriate range of the stored energy in the power storage unit;

a function of calculating the supply and demand energy for each of the grids at each of a plurality of periods of time;

a function of determining a combination of: the grid that supplies power; the grid that receives power; and transmitted energy, and energy with which each of the power storage units is charged and discharged, at each period of time, on the basis of the supply and demand energy, the stored power information and the appropriate range information; and a function of transmitting an instruction for controlling the power transmission of the power transmission and reception unit and the charging or discharging of the power storage unit, to the grid control apparatus, on the basis of the determined combination, and the program causes the grid control apparatus to further have a function of controlling the power transmission of the power transmission and reception unit and the charging or discharging of the power storage unit in accordance with the instruction.

44. The program according to 43, wherein at least one of the grids includes a power generation unit that generates power, and the program causes the grid integrated control apparatus to further have a function of receiving power generation information indicating generated energy of the power generation unit; and a function of receiving the power generation information from the power generation information receiver unit, at each of two or more periods of time, with respect to the grid including both the power storage unit and the power generation unit, and determining the appropriate range of the stored energy in the power storage unit on the basis of the received power generation information.

45. The program according to 44, causing the grid integrated control apparatus to further have a function of, in the determination of the appropriate range of the stored energy, reducing an upper limit of the appropriate range of the stored energy in the power storage unit included in the same grid as to which the power generation unit having an increase in generated energy belongs to, on the basis of the power generation information at the plurality of periods of time, and increasing a lower limit of the appropriate range of the stored energy in the power storage unit included in the same grid as to which the power generation unit having a reduction in generated energy belongs to.

46. The program according to 45, causing the grid integrated control system to further have a function of repeatedly performing the determination of the appropriate range of the stored energy.

47. A program causing a computer to have a function of operating as a grid control apparatus that controls a grid, wherein the grid is connected to at least one or more other grids through a power transmission line, and includes a power transmission and reception unit that transmits and receives power between the grid and the other grid through the power transmission line, and the program causes the computer to have:

a function of receiving demand energy indicating the energy supplied from the other grid to the grid;

a function of receiving supply energy indicating the energy supplied to the other grid by the grid;

a function of calculating supply and demand energy indicating a difference between the supply energy and the demand energy; and a function of controlling the power transmission and reception unit in accordance with an instruction from the grid integrated control apparatus, connected to the grid control apparatus through a communication line, which determines a combination of: the grid that supplies power; the grid that receives power, and transmitted energy, on the basis of the supply and demand energy which is received from the grid control apparatus.

48. The program according to 47, wherein the grid integrated control apparatus gives an instruction to the computer whenever the supply and demand energy is received from the computer, and the program causes the computer to have a function of repeatedly calculating the supply and demand energy and transmitting the calculated amount to the grid integrated control apparatus.

49. A control method which is executed by a computer that controls a plurality of grids which are arranged dispersedly, wherein each of the grids is connected to at least one or more other grids through a power transmission line, transmits and receives power between the grid and the other grid through the power transmission line, and controls the transmission and reception of the power on the basis of a control instruction which is received from the computer connected through a communication line, and the control method comprises:

a step of, regarding each of the grids, receiving supply and demand energy information having supply and demand energy indicating a difference between an energy supplied to the other grid by the grid and an energy supplied from the other grid to the grid;

a step of receiving cost information indicating a cost involved in power transmission between the grids; and a step of determining a combination of: the grid that supplies power; the grid that receives power; and transmitted energy, on the basis of the supply and demand energy information and the cost information, generating a control instruction for controlling the power transmission of each of the grids on the basis of the determined combination, and transmits the control instruction to each of the grids.

50. The control method according to 49, further comprising:

a step of repeatedly receiving the supply and demand energy information; and a step of generating and transmitting the control instruction whenever the supply and demand energy information is received.

51. The control method according to 49 or 50, wherein at least one or more of the grids includes a power storage unit which is capable of storing power, and the grid control unit charges and discharges the power storage unit on the basis of a control instruction which is received from the computer, and the control method further comprises:

a step of receiving stored power information indicating the stored energy in the power storage unit;

a step of receiving appropriate range information indicating an appropriate range of the stored energy in the power storage unit;

a step of receiving the supply and demand energy information having the supply and demand energy for each of the grids at each of a plurality of periods of time;

a step of determining a combination of: the grid that supplies power; the grid that receives power; and transmitted energy, and energy with which each of the power storage units is charged and discharged, at each period of time, on the basis of the supply and demand energy information, the stored power information and the appropriate range information; and a step of generating the control instruction for controlling the power transmission of each of the grids and the charging or discharging of the power storage unit, on the basis of the determined combination, and transmitting the generated instruction to each of the grids.

52. The control method according to 51, wherein at least one of the grids includes a power generation unit that generates power, and the control method further comprises:

a step of receiving power generation information indicating generated energy of the power generation unit; and a step of determining the appropriate range of the stored energy in the power storage unit on the basis of the received power generation information, at each of two or more periods of time, with respect to the grid including both the power storage unit and the power generation unit.

53. The control method according to 52, further comprising a step of, in the determination of the appropriate range of the stored energy, reducing an upper limit of the appropriate range of the stored energy in the power storage unit included in the same grid as to which the power generation unit having an increase in generated energy belongs to, on the basis of the power generation information at the plurality of periods of time, and increasing a lower limit of the appropriate range of the stored energy in the power storage unit included in the same grid as to which the power generation unit having a reduction in generated energy belongs to.

54. The control method according to 52 or 53, further comprising a step of repeatedly performing the determination of the appropriate range of the stored energy.

55. The control method according to any one of 49 to 54, further comprising:

a step of receiving demand energy indicating the energy supplied from the other grid to the grid;

a step of receiving supply energy indicating the energy supplied to the other grid by the grid; and a step of calculating supply and demand energy indicating a difference between the demand energy and the supply energy.

56. A control method of causing a grid control system including a plurality of grids control apparatus and a grid integrated control apparatus to control a grid, wherein the grid integrated control apparatus and the grid control apparatus are connected to each other through a communication line, the grid is connected to the grid control apparatus through a communication line, is connected to at least one or more other grids through a power transmission line, and includes a power transmission and reception unit that transmits and receives power between the grid and the other grid through the power transmission line, and the control method comprises:

a step of causing the grid integrated control apparatus to receive demand energy indicating the energy supplied from the other grid to the grid;

a step of causing the grid integrated control apparatus to receive supply energy indicating the energy supplied to the other grid by the grid;

a step of causing the grid integrated control apparatus to calculate supply and demand energy indicating a difference between the supply energy and the demand energy;

a step of causing the grid integrated control apparatus to receive cost information indicating a cost involved in power transmission between the grids;

a step of causing the grid integrated control apparatus to determine a combination of: the grid that supplies power; the grid that receives power; and transmitted energy, on the basis of the supply and demand energy and the cost information, and transmit an instruction to each of the grid control apparatuses on the basis of the determined combination; and a step of causing the grid control apparatus to control the power transmission and reception unit in accordance with an instruction from the grid integrated control apparatus.

57. The control method according to 56, further comprising:

a step of causing the grid integrated control apparatus to repeatedly calculate the supply and demand energy; and a step of causing the grid integrated control apparatus to generate and transmit the control instruction whenever the supply and demand energy is calculated.

58. The control method according to 56 or 57, wherein at least one or more of the grids includes a power storage unit which is capable of storing power, and the grid control unit charges and discharges the power storage unit on the basis of a control instruction which is received from the grid integrated control apparatus, and the control method further comprises:

a step of receiving stored power information indicating the stored energy in the power storage unit;

a step of causing the grid integrated control apparatus to receive appropriate range information indicating an appropriate range of the stored energy in the power storage unit;

a step of causing the grid integrated control apparatus to calculate the supply and demand energy for each of the grids at each of a plurality of periods of time;

a step of causing the grid integrated control apparatus to determine a combination of: the grid that supplies power; the grid that receives power; and transmitted energy, and energy with which each of the power storage units is charged and discharged, at each period of time, on the basis of the supply and demand energy, the stored energy information and the appropriate range information;

a step of causing the grid integrated control apparatus to transmit an instruction for controlling the power transmission of the power transmission and reception unit and the charging or discharging of the power storage unit, to the grid control apparatus, on the basis of the determined combination; and a step of causing the grid control apparatus to control the power transmission of the power transmission and reception unit and the charging or discharging of the power storage unit in accordance with the instruction.

59. The control method according to 58, wherein at least one of the grids includes a power generation unit that generate power, and the control method further comprises:

a step of causing the grid integrated control apparatus to receive power generation information indicating a generated energy of the power generation unit; and a step of causing the grid integrated control apparatus to receive the power generation information from the power generation information receiver unit, at each of two or more periods of time, with respect to the grid including both the power storage unit and the power generation unit, and determine the appropriate range of the stored energy in the power storage unit on the basis of the received power generation information.

60. The control method according to 59, further comprising a step of causing the grid integrated control apparatus to, in the determination of the appropriate range of the stored energy, reduce an upper limit of the appropriate range of the stored energy in the power storage unit included in the same grid as to which the power generation unit having an increase in generated energy belongs to, on the basis of the power generation information at the plurality of periods of time, and increase a lower limit of the appropriate range of the stored energy in the power storage unit included in the same grid as to which the power generation unit having a reduction in generated energy belongs to.

61. The control method according to 59 or 60, further comprising a step of causing the grid integrated control system to repeatedly perform the determination of the appropriate range of the stored energy.

62. A control method of causing a grid control system including a grid control apparatus that controls a grid and a grid integrated control apparatus that controls a plurality of the grid control apparatuses to control the grid, wherein the grid integrated control apparatus and the grid control apparatus are connected to each other through a communication line, the grid is connected to the grid control apparatus through a communication line, is connected to at least one or more other grids through a power transmission line, and includes a power transmission and reception unit that transmits and receives power between the grid and the other grid through the power transmission line, and the control method comprises:

a step of causing the grid apparatus to receive demand energy indicating the energy supplied from the other grid to the grid;

a step of the grid apparatus to receive supply energy indicating the energy supplied to the other grid by the grid;

a step of causing the grid apparatus, to calculate supply and demand energy indicating a difference between the supply energy and the demand energy and transmit the calculated energy to the grid integrated control apparatus;

a step of causing the grid integrated control apparatus to receive cost information indicating a cost involved in power transmission between the grids;

a step of causing the grid integrated control apparatus to determine a combination of: the grid that supplies power; the grid that receives power; and transmitted energy, on the basis of the supply and demand energy and the cost information, and transmit an instruction to each of the grid control apparatuses on the basis of the determined combination; and a step of the grid control apparatus to control the power transmission and reception unit in accordance with an instruction from the grid integrated control apparatus.

63. The control method according to 62, further comprising:
a step of causing the grid control apparatus to repeatedly calculate the supply and demand energy and transmit the resultant to the grid integrated control apparatus; and
a step of causing the grid integrated control apparatus to generate and transmit the control instruction whenever the supply and demand energy is received from the grid control apparatus.

64. The control method according to 61 or 62,
wherein at least one or more of the grids includes a power storage unit which is capable of storing power, and the grid control unit charges and discharges the power storage unit on the basis of a control instruction which is received from the grid integrated control apparatus, and
the control method further comprises:
a step of causing the grid integrated control apparatus to receive stored power information indicating the stored energy in the power storage unit;
a step of causing the grid integrated control apparatus to receive appropriate range information indicating an appropriate range of the stored energy in the power storage unit;
a step of causing the grid control apparatus to calculate the supply and demand energy for each of the grids at each of a plurality of periods of time, and transmit the resultant to the grid integrated control apparatus;
a step of causing the grid integrated control apparatus to determine a combination of: the grid that supplies power; the grid that receives power; and transmitted energy, and energy with which each of the power storage units is charged and discharged, at each period of time, on the basis of the supply and demand energy, the stored power information and the appropriate range information;
a step of causing the grid integrated control apparatus to transmit an instruction for controlling the power transmission of the power transmission and reception unit and the charging or discharging of the power storage unit, to the grid control apparatus, on the basis of the determined combination; and
a step of causing the grid control apparatus to control the power transmission of the power transmission and reception unit and the charging or discharging of the power storage unit in accordance with the instruction.

65. The control method according to 64,
wherein at least one of the grids includes a power generation unit that generates power, and
the control method further comprises:
a step of causing the grid integrated control apparatus to receive power generation information indicating a generated energy of the power generation unit; and
a step of causing the grid integrated control apparatus to receive the power generation information from the power generation information receiver unit, at each of two or more periods of time, with respect to the grid including both the power storage unit and the power generation unit, and determine the appropriate range of the stored energy in the power storage unit on the basis of the received power generation information.

66. The control method according to 65, further comprising a step of causing the grid integrated control apparatus to, in the determination of the appropriate range of the stored energy, reduce an upper limit of the appropriate range of the stored energy in the power storage unit included in the same grid as to which the power generation unit having an increase in generated energy belongs to, on the basis of the power generation information at the plurality of periods of time, and increase a lower limit of the appropriate range of the stored energy in the power storage unit included in the same grid as to which the power generation unit having a reduction in generated energy belongs to.

67. The control method according to any one of 62 to 66, further comprising a step of causing the grid integrated control system to repeatedly perform the determination of the appropriate range of the stored energy.

68. A control method which is executed by a computer that controls a grid control apparatus controlling a grid,
wherein the grid is connected to at least one or more other grids through a power transmission line, and includes a power transmission and reception unit that transmits and receives power between the grid and the other grid through the power transmission line, and
the control method comprises:
a step of receiving demand energy indicating the energy supplied from the other grid to the grid;
a step of receiving supply energy indicating the energy supplied to the other grid by the grid;
a step of calculating supply and demand energy indicating a difference between the supply energy and the demand energy; and
a step of controlling the power transmission and reception unit in accordance with an instruction from the grid integrated control apparatus, connected to the grid control apparatus through a communication line, which determines a combination of: the grid that supplies power; the grid that receives power; and transmitted energy, on the basis of the supply and demand energy which is received from the grid control apparatus.

69. The control method according to 68,
wherein the grid integrated control apparatus gives an instruction to the computer whenever the supply and demand energy is received from the computer, and
the control method further comprises a step of repeatedly calculating the supply and demand energy and transmitting the resultant to the grid integrated control apparatus.

The application claims priority to Japanese Patent Application No. 2012-168250 filed on Jul. 30, 2012, the content of which is incorporated herein by reference in its entirety.

The invention claimed is:
1. A grid control system, comprising:
a plurality of grids, wherein each of the plurality of grids includes at least one processor configured to execute machine-readable instructions to implement:
a power transmission and reception unit that transmits and receives power between a grid of the plurality of grids and one or more other grids of the plurality of grids through a power transmission line; and
a grid control unit that controls the power transmission and reception unit on the basis of a control instruction received from a grid integrated control apparatus connected through a communication line,
wherein at least one of the grids of the plurality of grids includes a distribution unit that distributes power to a consumer consuming power; and
the grid integrated control apparatus comprises at least one processor configured to execute machine-readable instructions to implement:
a supply and demand energy information receiver unit that receives, for each of the grids of the plurality of grids, supply and demand energy information indicating a difference between supply energy from the grid to the one or more other grids and supply energy to the grid from the one or more other grids;
a cost information receiver unit that receives cost information indicating a cost required for power transmission between the plurality of grids, the cost information including a wheeling charge per unit time required for power transmission through the power transmission line for each combination of a grid of the plurality of grids that supplies power and a grid of the plurality of grids that receives power, and a power loss caused by power transmission through the power transmission line for each combination of a grid of the plurality of grids that supplies power and a grid of the plurality of grids that receives power;

a grid control instruction generation unit that performs:
determining a combination of: the grid that supplies power; the grid that receives power; and a transmitted energy, on the basis of the supply and demand energy information received by the supply and demand energy information receiver unit and the cost information received by the cost information receiver unit;
generating the control instruction for controlling power transmission of each of the grids of the plurality of grids on the basis of the determined combination; and
transmitting the control instruction to each of the grids, the control instruction adjusting an amount of the power supplied by the grid that supplies power based on the determined combination;
wherein one or more of the grids includes a power storage unit configured to store energy; and
a range determination unit that sets a range of the stored energy by increasing and/or decreasing an upper limit and/or a lower limited of a range of the stored energy on the basis of the control instruction.

2. The grid control system according to claim 1, wherein the power supply and demand information receiver unit repeatedly receives the supply and demand energy information, and
wherein the grid control instruction generation unit generates and transmits the control instruction when the supply and demand energy information receiver unit receives the supply and demand energy information.

3. The grid control system according to claim 1, wherein the grid control unit charges or discharges the power storage unit on the basis of the control instruction received from the grid integrated control apparatus, and
wherein the at least one processor of the grid integrated control apparatus is further configured to execute the machine readable instructions to implement:
a stored power information receiver unit that receives stored power information indicating a stored energy in the power storage unit; and
an appropriate range information receiver unit that receives appropriate range information indicating an appropriate range of the stored energy in the power storage unit,
wherein the supply and demand energy information has the supply and demand energy for each of the grids for each of a plurality of periods of time, and
wherein the grid control instruction generation unit performs:
receiving the stored power information of the power storage unit from the stored power information receiver unit;
receiving the appropriate range information of the power storage unit from the appropriate range receiver unit;

determining, for each period of time, a combination of: the grid that supplies power; the grid that receives power; and the transmitted energy, and energy with which each of the power storage units is charged or discharged, on the basis of the supply and demand energy information, the stored power information, and the appropriate range information;
generating the control instruction for controlling the power transmission of each of the grids and the charging or discharging of the power storage unit, on the basis of the determined combination; and
transmitting the generated instruction to each of the grids.

4. The grid control system according to claim 3, wherein at least one of the grids includes a power generation unit that generates power, and
wherein the at least one processor of the grid integrated control apparatus is further configured to execute the machine-readable instructions to implement:
a power generation information receiver unit that receives power generation information indicating generated energy of the power generation unit; and
wherein the range determination unit, for each of two or more periods of time, performs: receiving the power generation information from the power generation information receiver unit with respect to the grid including both the power storage unit and the power generation unit; and determining the range of the stored energy in the power storage unit on the basis of the received power generation information.

5. The grid-control system according to claim 4, wherein in the determination of the range of the stored energy, on the basis of the power generation information during the plurality of periods of time, the appropriate range determination unit performs:
reducing the upper limit of the range of the stored energy in the power storage unit included in the same grid as that the power generation unit having an increase in generated energy belongs to; and
increasing the lower limit of the range of the stored energy in the power storage unit included in the same grid as that the power generation unit having a reduction in generated energy belongs to.

6. The grid control system according to claim 4, wherein the range determination unit repeatedly performs the determination of the range of the stored energy.

7. The grid control system according to claim 1, wherein the at least one process of the integrated control apparatus is further configured to execute the machine-readable instructions to implement:
a demand energy receiver unit that receives demand energy indicating the energy supplied to the grid from other grids;
a supply energy receiver unit that receives supply energy indicating the energy supplied from the grid to other grids; and
a supply and demand energy calculation unit that calculates supply and demand energy indicating a difference between the demand energy received by the demand energy receiver unit and the supply energy received by the supply energy receiver unit,
wherein the supply and demand energy information receiver unit receives the supply and demand energy information having the supply and demand energy calculated by the supply and demand energy calculation unit.

8. The grid control system of claim 1, wherein the cost is determined by normalizing the wheeling charge and the power loss and computing a product of the normalized wheeling charge and the normalized power loss.

9. The grid control system according to claim 1, wherein the amount of the power supplied by the grid that supplies power is adjusted via the control instruction at predetermined time intervals.

10. A grid control system, comprising:
a plurality of grid control apparatuses, each configured to control a grid of a plurality of grids; and
a grid integrated control apparatus that controls the plurality of the grid control apparatuses,
wherein a grid of the plurality of grids is connected to one or more other grids of the plurality of grids through a power transmission line, and includes a power transmission and reception unit that transmits and receives power between the grid and the one or more other grids through the power transmission line,
wherein at least one of the grids includes a distribution unit that distributes power to a consumer consuming power,
wherein each of the grid control apparatuses includes at least one processor configured to execute machine-readable instructions to implement:
a demand energy receiver unit that receives demand energy indicating the energy supplied to the grid from the one or more other grids;
a supply energy receiver unit that receives supply energy indicating the energy supplied from the grid to the one or more other grids;
a supply and demand energy information generation unit performs:
generating supply and demand energy information having supply and demand energy indicating a difference between the supply energy received by the supply energy receiver unit and the demand energy received by the demand energy receiver unit; and
transmitting the generated information to the grid integrated control apparatus; and
a grid control unit that controls the power transmission and reception unit in accordance with an instruction from the grid integrated control apparatus connected through a communication line, and
wherein the grid integrated control apparatus includes at least one processor configured to execute machine-readable instructions to implement:
a supply and demand energy information receiver unit that receives the supply and demand energy information from each of the plurality of grid control apparatuses;
a cost information receiver unit that receives cost information indicating a cost required for power transmission between the plurality of grids, the cost information including a wheeling charge per unit time required for power transmission through the power transmission line for each combination of a grid of the plurality of grids that supplies power and a grid of the plurality of grids that receives power, and a power loss caused by power transmission through the power transmission line for each combination of a grid of the plurality of grids that supplies power and a grid of the plurality of grids that receives power; and
a grid control instruction generation unit that:
determines a combination of: the grid that supplies power; the grid that receives power; and a transmitted energy, on the basis of the supply and demand energy information received by the supply and demand energy information receiver unit and the cost information received by the cost information receiver unit, and
transmits an instruction to each of the plurality of grid control apparatuses on the basis of the determined combination, the instruction adjusting an amount of the power supplied by the grid that supplies power based on the determined combination;
wherein one or more of the grids includes a power storage unit configured to store energy; and
a range determination unit that sets a range of the stored energy by increasing and/or decreasing an upper limit and/or a lower limited of a range of the stored energy on the basis of the control instruction.

11. The grid control system of claim 10, wherein the cost is determined by normalizing the wheeling charge and the power loss and computing a product of the normalized wheeling charge and the normalized power loss.

12. A grid control system, comprising:
a plurality of grid control apparatuses, each configured to control a grid of a plurality of grids; and
a grid integrated control apparatus that controls the plurality of the grid control apparatuses,
wherein a grid of the plurality of grids is connected to the grid integrated control apparatus through a communication line, is connected to one or more other grids of the plurality of grids through a power transmission line, and includes a power transmission and reception unit transmitting and receiving power between the grid and the one or more other grids through the power transmission line,
wherein at least one of the grids includes a distribution unit that distributes power to a consumer consuming power,
wherein the grid control apparatus includes a grid control unit that controls the power transmission and reception unit in accordance with an instruction from the grid integrated control apparatus being connected through a communication line, and
wherein the grid integrated control apparatus includes at least one processor configured to execute machine-readable instructions to implement:
a demand energy receiver unit that receives demand energy indicating the energy supplied to the grid from the one or more other grids;
a supply energy receiver unit that receives supply energy indicating the energy supplied from the grid to the one or more other grids;
a supply and demand energy calculation unit that calculates supply and demand energy indicating a difference between the supply energy received by the supply energy receiver unit and the demand energy received by the demand energy receiver unit;
a cost information receiver unit that receives cost information indicating a cost required for power transmission between the plurality of grids, the cost information including a wheeling charge per unit time required for power transmission through the power transmission line for each combination of a grid of the plurality of grids that supplies power and a grid of the plurality of grids that receives power, and a power loss caused by power transmission through the power transmission line for each combination of a grid of the plurality of grids that supplies power and a grid of the plurality of grids that receives power;

a grid control instruction generation unit that:
  determines a combination of: the grid that supplies power; the grid that receives power; and a transmitted energy, on the basis of the supply and demand energy received from the supply and demand energy calculation unit and the cost information received from the cost information receiver unit, and
  transmits the instruction to each of the plurality of grid control apparatuses on the basis of the determined combination, the instruction adjusting an amount of the power supplied by the grid that supplies power based on the determined combination; and
wherein one or more of the grids includes a power storage unit configured to store energy; and
a range determination unit that sets a range of the stored energy by increasing and/or decreasing an upper limit and/or a lower limited of a range of the stored energy on the basis of the control instruction.

13. A grid control system, comprising:
a plurality of grids, wherein a grid of the plurality of grids is connected to one or more other grids of the plurality of grids through a power transmission line, and includes a power transmission and reception unit that transmits and receives power between the grid and the one or more other grids through the power transmission line,
wherein at least one of the grids includes a distribution unit that distributes power to a consumer consuming power, and
a grid control apparatus that comprises at least one processor configured to execute machine-readable instructions to implement:
  a demand energy receiver unit that receives demand energy indicating the energy supplied to the grid from the one or more other grids;
  a supply energy receiver unit that receives supply energy indicating the energy supplied from the grid to one or more other grids;
  a supply and demand energy calculation unit that calculates supply and demand energy indicating a difference between the supply energy received by the supply energy receiver unit and the demand energy received by the demand energy receiver unit; and
  a grid control unit configured to control the power transmission and reception unit in accordance with an instruction from a grid integrated control apparatus, and being connected to the grid integrated control apparatus through a communication line, wherein the grid control unit:
    determines a combination of: a grid that supplies power; a grid that receives power; and a transmitted energy, on the basis of the supply and demand energy received from the grid control apparatus, a wheeling charge per unit time required for power transmission between the respective grids through the power transmission line, and a power loss caused by power transmission between the respective grids through the power transmission line;
    generates a control instruction for controlling power transmission of at least one of the plurality of grids based on the determined combination, the control instruction adjusting an amount of power supplied by the grid that supplies power based on the determined combination; and
  wherein one or more of the grids includes a power storage unit configured to store energy; and
  a range determination unit that sets a range of the stored energy by increasing and/or decreasing an upper limit and/or a lower limited of a range of the stored energy on the basis of the control instruction.

14. A non-transitory computer-readable storage medium that stores computer-executable instructions that, when executed by a processor, cause the processor to perform a method, comprising: a program causing a computer to have a function of operating as a grid integrated control apparatus that for each of a plurality of grids connected to one or more other grids of the plurality of grids via a power transmission line through which power can be transmitted and received,
receiving supply and demand energy information having supply and demand energy indicating a difference between energy supplied from a grid of the plurality of grids to one or more other grids of the plurality of grids and energy supplied to the grid from the one or more other grids;
  receiving cost information indicating a cost required for power transmission between the plurality of grids, the cost information including a wheeling charge per unit time required for power transmission through the power transmission line for each combination of a grid of the plurality of grids that supplies power and a grid of the plurality of grids that receives power, and a power loss caused by power transmission through the power transmission line for each combination of a grid of the plurality of grids that supplies power and a grid of the plurality of grids that receives power;
  determining a combination of: the grid that supplies power; the grid that receives power; and a transmitted energy, on the basis of the supply and demand energy information and the cost information;
  generating a control instruction for controlling the power transmission of each of the plurality of grids on the basis of the determined combination, and transmitting the control instruction to each of the plurality of grids, the control instruction adjusting an amount of the power supplied by the grid that supplies power based on the determined combination; and
setting a range of stored energy in a power storage unit of one or more of the grids by increasing and/or decreasing an upper limit and/or a lower limited of a range of the stored energy on the basis of the control instruction.

15. A control method, comprising:
for each of a plurality of grids connected to one or more other grids of the plurality of grids via a power transmission line through which power can be transmitted and received, receiving supply and demand energy information having supply and demand energy indicating a difference between energy supplied from a grid of the plurality of grids to one or more other grids of the plurality of grids and energy supplied to the grid from the one or more other grids;
receiving cost information indicating a cost required for power transmission between the plurality of grids, the cost information including a wheeling charge per unit time required for power transmission through the power transmission line for each combination of a grid of the plurality of grids that supplies power and a grid of the plurality of grids that receives power, and a power loss caused by power transmission through the power transmission line for each combination of a grid of the plurality of grids that supplies power and a grid of the plurality of grids that receives power;
determining a combination of: the grid that supplies power; the grid that receives power; and a transmitted energy, on the basis of the supply and demand energy information and the cost information;

generating a control instruction for controlling the power transmission of each of the plurality of grids on the basis of the determined combination;

transmitting the control instruction to each of the grids, the control instruction adjusting an amount of the power supplied by the grid that supplies power based on the determined combination; and setting a range of stored energy in a power storage unit of one or more of the grids by increasing and/or decreasing an upper limit and/or a lower limited of a range of the stored energy on the basis of the control instruction.

16. The control method of claim 15, wherein the cost is determined by normalizing the wheeling charge and the power loss and computing a product of the normalized wheeling charge and the normalized power loss.

* * * * *